United States Patent
Steiner et al.

(10) Patent No.: US 11,937,736 B2
(45) Date of Patent: Mar. 26, 2024

(54) COOKING APPLIANCE WITH CONDUCTIVE HEATING CAPABILITIES

(71) Applicant: Spectrum Brands, Inc., Middleton, WI (US)

(72) Inventors: Peter Alan Steiner, Madison, WI (US); Jacob Daniel Smith, Monona, WI (US); John Aaron Miller, Marshall, WI (US); Drew William Heidenreich, Monona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 17/193,460

(22) Filed: Mar. 5, 2021

(65) Prior Publication Data
US 2021/0274968 A1    Sep. 9, 2021

Related U.S. Application Data

(60) Provisional application No. 63/085,459, filed on Sep. 30, 2020, provisional application No. 62/986,071, filed on Mar. 6, 2020.

(51) Int. Cl.
*A47J 37/06* (2006.01)
*A23L 5/10* (2016.01)
(Continued)

(52) U.S. Cl.
CPC ............ *A47J 37/0629* (2013.01); *A23L 5/15* (2016.08); *A47J 36/16* (2013.01); *A47J 36/2483* (2013.01);
(Continued)

(58) Field of Classification Search
CPC ............... A47J 37/0629; A47J 37/0664; A47J 37/0694; A47J 37/015; A47J 37/0676;
(Continued)

(56) References Cited

U.S. PATENT DOCUMENTS 1,817,118 A * 8/1931 Adami ................ A47J 37/0676
                                                    219/476
2,024,386 A   12/1935 Phelps
(Continued)

FOREIGN PATENT DOCUMENTS

EP    1818620 A1    8/2007
EP    2456284 A1    5/2012
(Continued)

OTHER PUBLICATIONS

International Search Report for co-pending PCT/US2021/021150; 4 pages, dated Jun. 23, 2021.

*Primary Examiner* — Steven B McAllister
*Assistant Examiner* — Daniel E. Namay
(74) *Attorney, Agent, or Firm* — Kagan Binder, PLLC

(57) ABSTRACT

A cooking appliance includes an oven body having an interior compartment and a door panel for accessing the interior compartment, wherein the interior compartment is sized to receive a food product; a removable heated tray positionable within the interior compartment, wherein the heated tray includes a top tray surface and a first heating source positioned below the top tray surface; and a second heating source positioned within the interior compartment.

14 Claims, 15 Drawing Sheets

(51) Int. Cl.
*A47J 36/16* (2006.01)
*A47J 36/24* (2006.01)
*F24C 7/06* (2006.01)
*F24C 15/00* (2006.01)
*F24C 15/16* (2006.01)
*H05B 3/06* (2006.01)
*H05B 3/68* (2006.01)
*A47J 37/01* (2006.01)

(52) U.S. Cl.
CPC ....... *A47J 37/0664* (2013.01); *A47J 37/0676* (2013.01); *A47J 37/0694* (2013.01); *F24C 7/067* (2013.01); *F24C 15/003* (2013.01); *F24C 15/166* (2013.01); *H05B 3/06* (2013.01); *H05B 3/681* (2013.01); *A23V 2002/00* (2013.01); *A47J 37/015* (2013.01)

(58) Field of Classification Search
CPC ........ A47J 37/08; A47J 36/16; A47J 36/3483; A23L 5/15; F24C 7/067; F24C 7/062; F24C 7/04; F24C 15/166
USPC .......... 126/19 R, 275 E, 339, 152 B; 99/390
See application file for complete search history.

(56) References Cited

U.S. PATENT DOCUMENTS

| | | | |
|---|---|---|---|
| 3,262,382 A * | 7/1966 | Williams | A47J 37/0676 99/339 |
| 3,683,150 A * | 8/1972 | Kehl | A47J 37/0676 219/200 |
| 3,760,156 A * | 9/1973 | Kehl | H05B 3/70 219/448.17 |
| 4,476,848 A | 10/1984 | Protas | |
| 4,780,597 A * | 10/1988 | Linhart | F24C 15/166 219/396 |
| 5,272,317 A | 12/1993 | Ryu | |
| 5,323,692 A | 6/1994 | Grzywna et al. | |
| 5,345,067 A * | 9/1994 | Ohta | F24C 7/08 345/44 |
| 5,380,986 A | 1/1995 | Mullen | |
| 5,483,947 A | 1/1996 | Giebel et al. | |
| 5,656,188 A | 8/1997 | Janowiak et al. | |
| 5,665,259 A * | 9/1997 | Westerberg | F24C 7/087 426/523 |
| 5,782,165 A | 7/1998 | Glenboski et al. | |
| D409,041 S | 5/1999 | Barker | |
| 5,938,959 A * | 8/1999 | Wang | A47J 37/0623 219/401 |
| 6,069,345 A * | 5/2000 | Westerberg | F24C 7/06 426/243 |
| 6,111,226 A | 8/2000 | Lee | |
| 6,114,665 A * | 9/2000 | Garcia | F24C 7/06 219/403 |
| 6,199,548 B1 | 3/2001 | Hsu | |
| 6,265,695 B1 | 7/2001 | Liebermann | |
| 6,288,369 B1 | 9/2001 | Sherman | |
| 6,362,458 B1 | 3/2002 | Sargunam et al. | |
| 6,603,099 B2 | 8/2003 | Gouthiere | |
| 6,621,053 B1 * | 9/2003 | Wensink | A47J 37/0694 126/337 R |
| 7,005,616 B2 * | 2/2006 | Kim | A47J 37/0676 219/386 |
| 7,122,765 B2 | 10/2006 | Wong et al. | |
| 7,129,447 B1 * | 10/2006 | Kim | F24C 15/325 219/394 |
| 7,223,944 B2 * | 5/2007 | Kitabayashi | F24C 15/325 219/395 |
| 7,973,264 B2 * | 7/2011 | Li | F24C 7/06 219/404 |
| 8,415,591 B2 * | 4/2013 | Boyer | F24C 14/005 219/393 |
| D703,993 S | 5/2014 | Garman | |
| D723,323 S | 3/2015 | Carlson | |
| 9,874,353 B2 * | 1/2018 | Thabit | A47J 37/04 |
| 9,879,864 B2 * | 1/2018 | Gutierrez | F24C 15/16 |
| D821,803 S | 7/2018 | Carlson | |
| 10,016,092 B2 | 7/2018 | Barrows et al. | |
| 10,054,316 B2 * | 8/2018 | Gutierrez | H01R 13/7032 |
| D838,535 S | 1/2019 | Garman | |
| 10,288,297 B2 * | 5/2019 | Gutierrez | F24C 15/16 |
| 10,551,068 B2 * | 2/2020 | Kim | F24C 15/005 |
| 10,690,352 B2 | 6/2020 | Smith et al. | |
| 10,995,963 B2 * | 5/2021 | Gutierrez | H01R 13/7032 |
| 2004/0149721 A1 * | 8/2004 | Coleman | H05B 3/74 219/460.1 |
| 2004/0182849 A1 | 9/2004 | Shozo et al. | |
| 2004/0262288 A1 * | 12/2004 | Kim | A47J 37/0676 219/451.1 |
| 2008/0099461 A1 * | 5/2008 | Li | A47J 37/0641 219/402 |
| 2010/0071566 A1 * | 3/2010 | Liu | A47J 37/0676 99/447 |
| 2010/0320189 A1 * | 12/2010 | Buchheit | H05B 6/6441 426/107 |
| 2011/0248021 A1 * | 10/2011 | Gutierrez | F24C 15/16 219/620 |
| 2011/0266271 A1 * | 11/2011 | Boyer | F24C 15/00 219/393 |
| 2012/0138600 A1 | 6/2012 | Oomori et al. | |
| 2013/0192582 A1 * | 8/2013 | Boyer, III | F24C 14/005 126/19 R |
| 2014/0246418 A1 | 9/2014 | Ye et al. | |
| 2015/0208669 A1 * | 7/2015 | Klock | A47J 37/0611 426/523 |
| 2015/0297029 A1 * | 10/2015 | Smith | H05B 3/46 426/523 |
| 2016/0029829 A1 * | 2/2016 | Klein | A47J 37/08 99/332 |
| 2016/0033141 A1 * | 2/2016 | Rizzuto | F24C 15/327 219/396 |
| 2016/0220057 A1 | 8/2016 | Smith et al. | |
| 2016/0238260 A1 * | 8/2016 | Kayihan | F24C 15/327 |
| 2017/0016623 A1 * | 1/2017 | Rabie | F24C 7/088 |
| 2017/0027381 A1 * | 2/2017 | Everett, Jr. | A47J 37/0786 |
| 2017/0191670 A1 * | 7/2017 | Thabit | A47J 37/0629 |
| 2017/0318629 A1 * | 11/2017 | Mohseni | H05B 6/6402 |
| 2018/0073741 A1 * | 3/2018 | Kim | F24C 15/16 |
| 2018/0142902 A1 * | 5/2018 | Gutierrez | F24C 15/16 |
| 2018/0255972 A1 * | 9/2018 | Delgado | A47J 37/0664 |
| 2018/0347825 A1 * | 12/2018 | Gutierrez | F24C 15/16 |
| 2019/0014623 A1 | 1/2019 | Oguri et al. | |
| 2019/0021142 A1 | 1/2019 | Mizuta et al. | |
| 2019/0045590 A1 | 2/2019 | Kunimoto et al. | |
| 2019/0219272 A1 * | 7/2019 | Gutierrez | H01R 13/7037 |
| 2020/0253409 A1 * | 8/2020 | Cao | H05B 1/0261 |
| 2020/0253410 A1 * | 8/2020 | Smith | A47J 27/02 |
| 2021/0080114 A1 * | 3/2021 | Liu | A23L 5/15 |
| 2021/0092799 A1 * | 3/2021 | Weisser, Jr. | H05B 3/0033 |
| 2021/0161151 A1 * | 6/2021 | Thorogood | A21B 1/22 |

FOREIGN PATENT DOCUMENTS

| | | |
|---|---|---|
| EP | 2728966 A1 | 5/2014 |
| JP | 2004198107 A | 7/2004 |
| KR | 20100013216 A | 2/2010 |
| WO | 2018235354 A1 | 1/2020 |

\* cited by examiner

COOKING APPLIANCE WITH CONDUCTIVE HEATING CAPABILITIES

CROSS-REFERENCE TO RELATED APPLICATIONS

This application claims priority to and the benefit of U.S. Provisional Patent Application No. 62/986,071, filed Mar. 6, 2020, and U.S. Provisional Patent Application No. 63/085,459, filed Sep. 30, 2020, the entire contents of which are incorporated herein by reference in their entireties.

TECHNICAL FIELD

The present disclosure relates to a countertop appliance for cooking food. More specifically, the present disclosure relates to a cooking appliance or toaster oven that incorporates a removable lower heated surface that allows for easy cleaning of the oven interior while providing additional cooking functionality.

BACKGROUND

Toaster ovens are electrical cooking appliances that are typically positioned on a countertop, such as in a residential kitchen or in an office cafeteria. A toaster oven is like a small oven that is useful for toasting bread, for baking or broiling relatively small quantities of food, and for reheating food items without having to heat an entire standard oven, for example. Toaster ovens often have exposed heating elements along at least one of the top and bottom of the oven space. Top and bottom heating elements can be used to heat the oven space when toasting, baking, or broiling. Some models also include an internal fan that circulates heated air and allows the toaster oven to act as a convection oven with more even toasting and cooking capabilities.

The inner area of a toaster oven typically includes supports or extending features along its sides to accommodate one or more food shelves. Food can be placed directly on these shelves for cooking, or the food can be placed on a plate, in a baking dish, or on a baking pan that is subsequently positioned on a shelf in the toaster oven.

In operation, a user sets a dial or other control on the toaster oven to a desired temperature. The top and bottom heating elements then heat up until the internal oven temperature reaches the desired level. In toaster ovens that include a fan, the hot air is circulated throughout the oven. Once the desired temperature is reached, the user can place the food items in the toaster oven and set a timer for a predetermined length of time. The toaster oven will typically provide an audible signal to the user after that time period has ended, after which the food can be removed from the toaster oven.

While toaster ovens provide a number of conveniences, one common complaint is that they can be difficult to clean. Crumbs and pieces of food that fall from the shelf on which the food is placed can get stuck or burned onto the bottom of the oven, the heating element guards, and/or the heating elements, all of which can be difficult to access and clean. Although many toaster ovens include crumb trays that are positioned between the lower heating elements and the food, these crumb trays have limited effectiveness in preventing all of the food particles from reaching the heating elements, and can also get permanently stained.

There is therefore a need to provide a cooking appliance that is easier to clean and that allows for heating of food by conduction. It would further be advantageous to provide a toaster oven configuration that better utilizes the interior height of the oven while providing easier access to the inner area of the oven.

SUMMARY

In an embodiment, a cooking appliance, such as a toaster oven, includes an oven body having an interior compartment defined by a top wall, a bottom wall, first and second side walls extending between the top wall and the bottom wall, a back wall, and a door panel; a removable heated tray positionable within the interior compartment, wherein the heated tray includes a top tray surface and a first heating source positioned below the top tray surface; and a second heating source positioned within the interior compartment. In an alternative to embodiments described herein that include these walls, the oven body can include an interior compartment and a door for accessing this interior compartment, but does not specifically include top, bottom, back, and/or side walls.

The top tray surface may be a relatively flat surface, may include grill features, may include a non-stick material, may include a plurality of grates, and/or may include a pattern of at least one of raised and depressed areas. The heated tray may further include at least one side wall extending from the top tray surface, which may more specifically include multiple side walls extending around an outer perimeter of the top tray surface. The heated tray may be used for heating of food on its top tray surface via direct conduction. The heated tray of embodiments of the cooking appliance may be adapted for use as an independent cooking device outside the cooking appliance. The top tray surface of the heated tray may include visual indicia of at least one heating source.

The heated tray of cooking appliance embodiments described herein may be spaced from the bottom wall of the interior compartment. The first heating source may include at least one embedded tubular heater, wherein the at least one tubular heater comprises at least one tubular heating rod. The heating source may comprise multiple heaters, wherein the multiple heaters may be arranged generally parallel to each other across at least one of the length and width of the heated tray. The heating source may include at least one heating element configured in a zigzag arrangement, or may include at least one heating element that generally follows an outer perimeter of the top tray surface. The second heating source of embodiments of the cooking appliances described herein may be positioned adjacent to the top wall.

Embodiments of the cooking appliance may further include at least one removable tray positionable between the heated tray and the top wall of the interior compartment, wherein the removable tray may be a wire rack member. Further, the door panel may be a hinged access door. The heated tray may include an electrical connection for engagement with a receptor within the interior compartment, wherein the electrical connection may be water-safe.

The cooking appliance embodiments may include a control panel adjacent to the door panel at a front area of the oven body, wherein at least one of the control panel and the door panel may be removable. Cooking appliance embodiments may further include a steam cleaning mode in which the heated tray is adapted to contain a quantity of liquid and convert at least a portion of the quantity of liquid into steam.

In another embodiment, a cooking appliance is provided that includes an oven body having an interior compartment defined by a top wall, first and second side walls, a back wall, a door panel, and a removable heated tray, wherein the heated tray includes a top tray surface that defines the bottom of the interior compartment and a first heating source positioned below the top tray surface; and a second heating source positioned adjacent to the top wall.

BRIEF DESCRIPTION OF THE DRAWINGS

The present disclosure will be further explained with reference to the appended Figures, wherein like structure is referred to by like numerals throughout the several views, and wherein.

DETAILED DESCRIPTION

Figure 1:
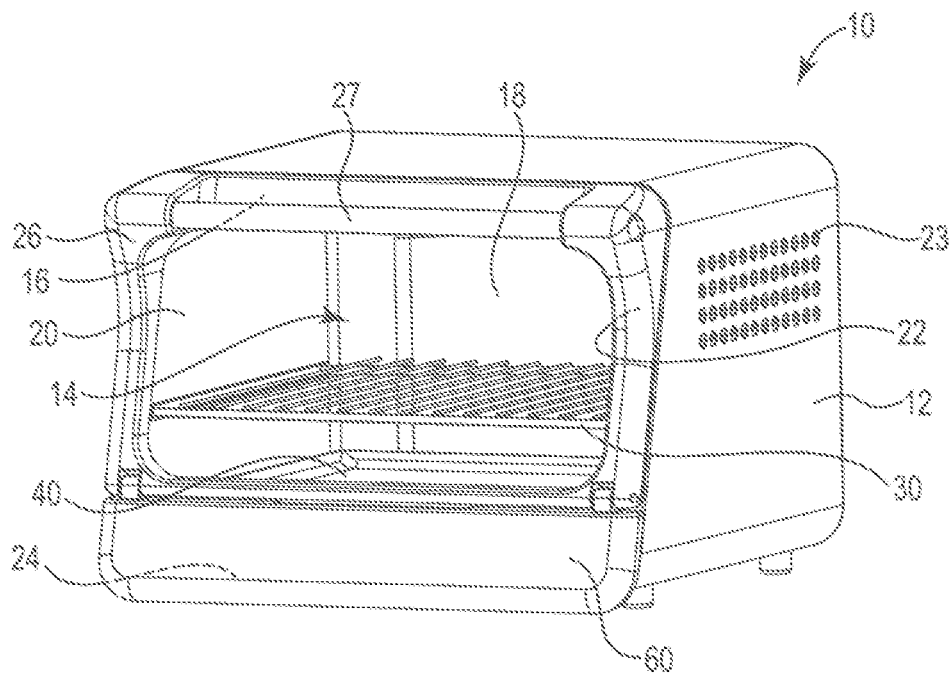
FIG. 1 is a perspective view of an embodiment of a cooking appliance of the present disclosure with its door in a closed position.

Referring now to the Figures, wherein the components are labeled with like numerals throughout the several Figures, and initially to FIGS. 1-5, an exemplary configuration of a cooking appliance or toaster oven 10 is illustrated. Toaster oven 10 includes an oven body 12 having an interior compartment 14 that is defined by a top wall 16, a back wall 18, opposite side walls 20, 22, a bottom wall 24, and a hinged door 26. The hinged door 26 forms the front of the oven 10 and is configured so that it pivots downwardly to provide access to the interior compartment 14. The toaster oven 10 further includes a tray or rack 30 and a removable heated tray 40 that are both removably positionable relative to the interior compartment 14.

The side walls 20, 22 each include at least one support feature, which is illustrated as an elongated slot 28 in each of the side walls. These slots 28 can extend along all or a part of the depth of the side walls 20, 22. The slots 28 are provided as a cooperating pair that are generally horizontally disposed and spaced at the same vertical location along their respective side walls 20, 22. In this way, a removable tray or rack 30 can be supported by the slots 28 in a horizontal orientation, which will generally be parallel to both the top wall 16 and the bottom wall 24. More than one pair of slots can be provided at different locations along the height of the side walls 20, 22 for positioning the tray or rack 30 at different heights within the oven body 12.

The side walls 20, 22 can be provided with pairs of flanges in addition to or instead of pairs of slots, wherein these flanges would act as a shelf to support an inserted tray or rack 30 in a desired vertical location within the oven body 12. If additional support for the tray or rack 30 is desired, the back wall 18 may also include flanges and/or slots. In another alternative, the tray or rack 30 is not supported by any wall features but instead rests on a top surface of the heated tray 40. As shown, the side walls 20, 22 also include vents 23 for dissipating heat generated during operation of the toaster oven 10. The back wall 18 and/or other areas of the oven body can also include vents, if desired.

Tray or rack 30 is sized and shaped to be supported by the support features 28 of the side walls 20, 22, and may have a wide variety of configurations. For one example, the tray or rack 30 may include a peripheral frame member and a series of elongated rods or grates that extend from one side of the frame to the other. In another example, wires or rods can be arranged into a pattern, such as a grid pattern, within the peripheral frame member. In another example, the tray or rack 30 may include a generally planar top surface across all or a part of its surface area. In yet another example, the tray or rack 30 can have a textured or patterned surface. The tray or rack 30 can optionally include a non-stick material on all or a part of its surface. In an embodiment, the toaster oven 10 can be provided with multiple interchangeable trays or racks 30 that have different cooking capabilities. In another embodiment, the toaster oven is not provided with any trays or racks 30, but is instead only provided with the heated tray 40.

Removable heated tray 40 includes a top tray surface 42 and a heating source 44 (shown in FIG. 5) positioned below and optionally attached to the bottom of the tray 40. In an embodiment in which the heating source is not attached to the bottom of the tray 40, the heating source can be spaced at least slightly from the bottom of the tray 40, but is close enough to the tray 40 to achieve the desired heating of its top tray surface 40 to allow for conductive heating of food products positioned thereon.

The top tray surface 42 may be relatively flat or planar across all or a part of its surface area, such as may be desirable to cook foods like pizza or other items that require a relatively uniform heated surface for conductive cooking. The top tray surface 42 may include areas with a raised pattern, such as a grate-like pattern, across all or a part of its surface area. Alternatively, the top tray surface 42 may include depressed areas or a combination of raised areas and depressed areas, where these areas may be in a pattern or randomly arranged across the top tray surface 42. The top tray surface 42 can optionally include a non-stick material on all or a part of its surface.

In another variation, an embedded heating element can appear on the top tray surface 42. In this way, a "visual indication" or visual indicia is provided to the user that the heated tray 40 comprises a heated surface. In such a variation, the heating element can be cast or brazed into place or otherwise attached so that the surface remains relatively smooth or flat.

Removable heated tray 40 can include at least one wall 46 extending upwardly from the top tray surface 42, such as along one of its peripheral edges. In an embodiment, side walls 46 extend upwardly from the top tray surface 42 around the perimeter of the heated tray 40 to provide a space that is enclosed on all sides, which may be convenient for containing foods within the perimeter of the heated tray 40. In addition, such walls provide additional cooking functionality for cooking techniques such as slow cooking, sautéing, or searing of foods. Further, this heated tray 40 could be used as a bake pan for foods provided in a batter form, such as for baking of brownies, which would eliminate the need for a separate baking pan.

Heat source 44 for the removable heated tray 40 is positioned under the top tray surface 42, and can be attached to the side of the heated tray 40 that is opposite the top tray surface 42. The heat source 44 may also be embedded or enclosed within the heated tray 40, such as by providing another tray surface (not shown) below the heat source 44. Such a tray surface can be provided as a heat shield that protects the area under the heated tray 40 from reaching an undesirably high temperature.

Figure 5:
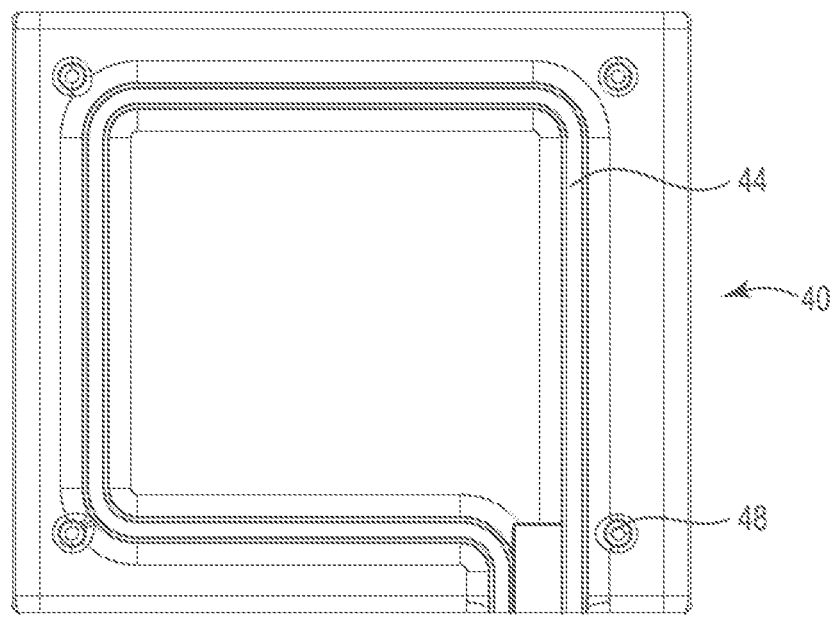
FIG. 5 is a bottom view of the heated tray of FIG. 4.

The heat source 44 may include one or more tubular heaters (e.g., tubular heaters commercially available under the trade designation "Calrod"), wherein FIG. 5 illustrates one configuration of heat source 44 on the bottom of the heated tray 40. Alternatively, the heat source for the heated tray 40 may include quartz-type heating element(s), ceramic-type heating element(s), halogen-type heating element(s), or the like. The heat source 44 is used to heat the tray 40 within the interior compartment 14. If multiple heat sources are provided, they may be arranged to generally follow the perimeter shape of the heated tray 40, or may be parallel to each other across the length or width of the heated tray 40, or may be provided in another configuration. In an embodiment where a single heat source is provided, it may be configured as a single tubular heater in a loop, a coil, a zigzag, or otherwise arranged to provide consistent heat to the top tray surface 42.

Although the figures illustrate a single-piece heated tray configuration, another embodiment of the toaster oven 10 includes a heated tray configuration that comprises a multi-piece tray, wherein each tray piece can have independent temperature controls. In this way, a user can simultaneously cook multiple food items at different temperatures that are in contact with the multi-piece heated tray configuration. Similarly, a single heated tray 40 may be provided with multiple cooking zones that allow for different surface temperatures across the surface of the heated tray 40.

The heated tray 40 can be supported within the interior compartment 14 by pairs of flanges, slots, and/or other support members of the side walls 20, 22, which can be the same or similar to those provided to support the tray or rack 30. Alternatively or additionally, the heated tray 40 can be provided with legs 48 or other support members extending from its bottom surface. The legs 48 can be arranged so that the heated tray 40 does not engage with side walls 22, but so that the legs 48 are in contact with the bottom wall 24. In any of these arrangements, the heated tray 40 is spaced from the bottom wall 24.

The heated tray 40 can utilize a wide variety of electrical connections to receive power. In one embodiment, a probe-style electrical connector (with or without its own temperature control) has a probe that is insertable into a hole 41 of heated tray 40. Electrical connection is made between terminals on the heated tray 40 and holes provided in the probe-style connector, and heat can be controlled with a thermostat control member, such as a dial or a knob. In another embodiment, a "plug style" connection is used, where male terminals of one component are inserted into a female receptor. In yet another embodiment, a magnetic style electrical connection is used wherein a magnet holds components together while positive and negative terminals are electrically connected. Other electrical connections can additionally or alternatively be used.

Figure 2:
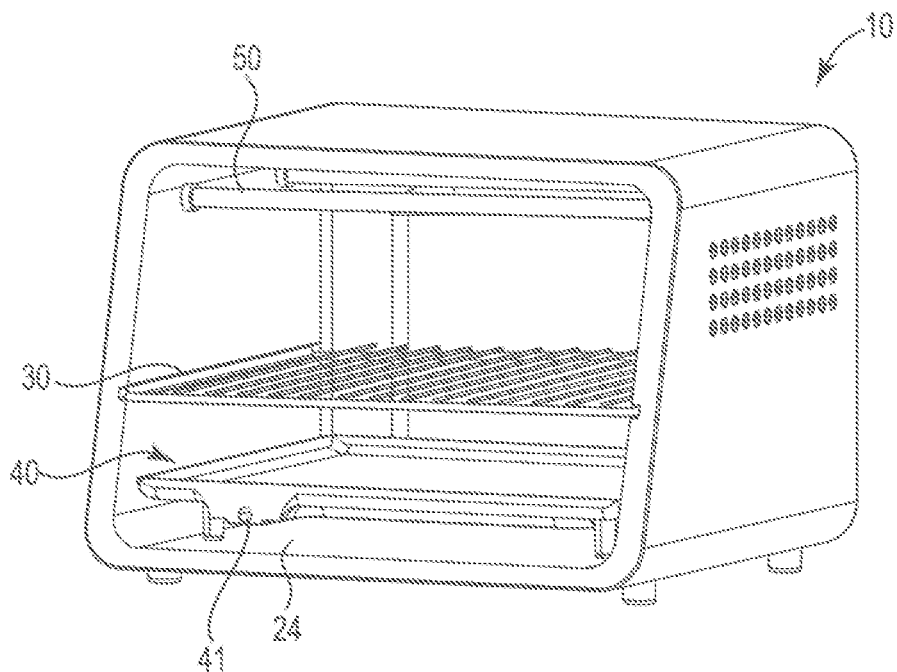
FIG. 2 is a perspective view of the cooking appliance of FIG. 1 with its door and control panel removed.
Figure 3:
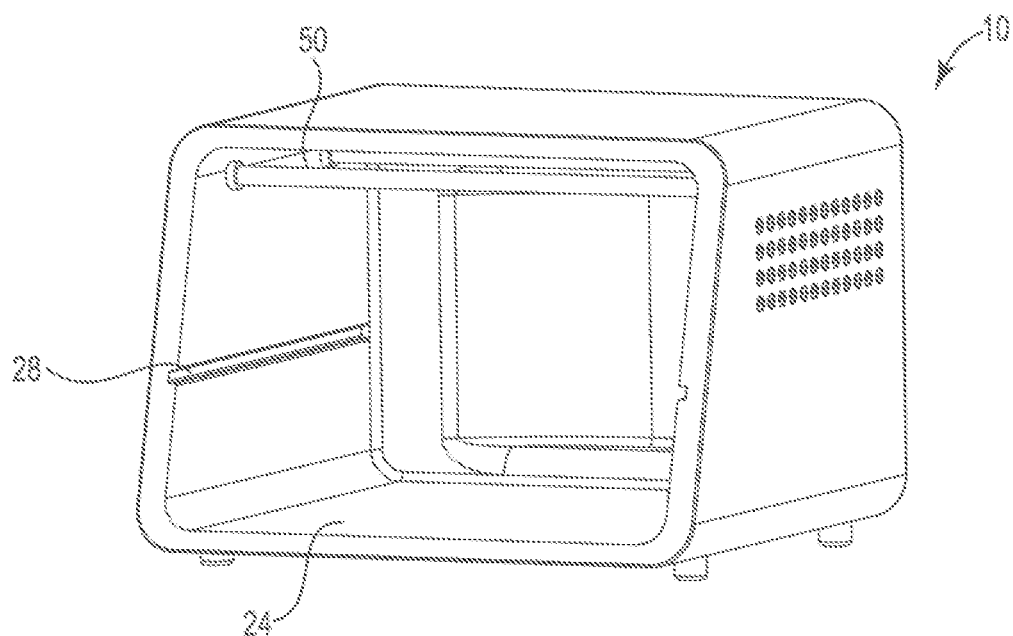
FIG. 3 is a perspective view of the cooking appliance of FIG. 1 with its door, control panel, and heated lower tray removed.
Figure 4:
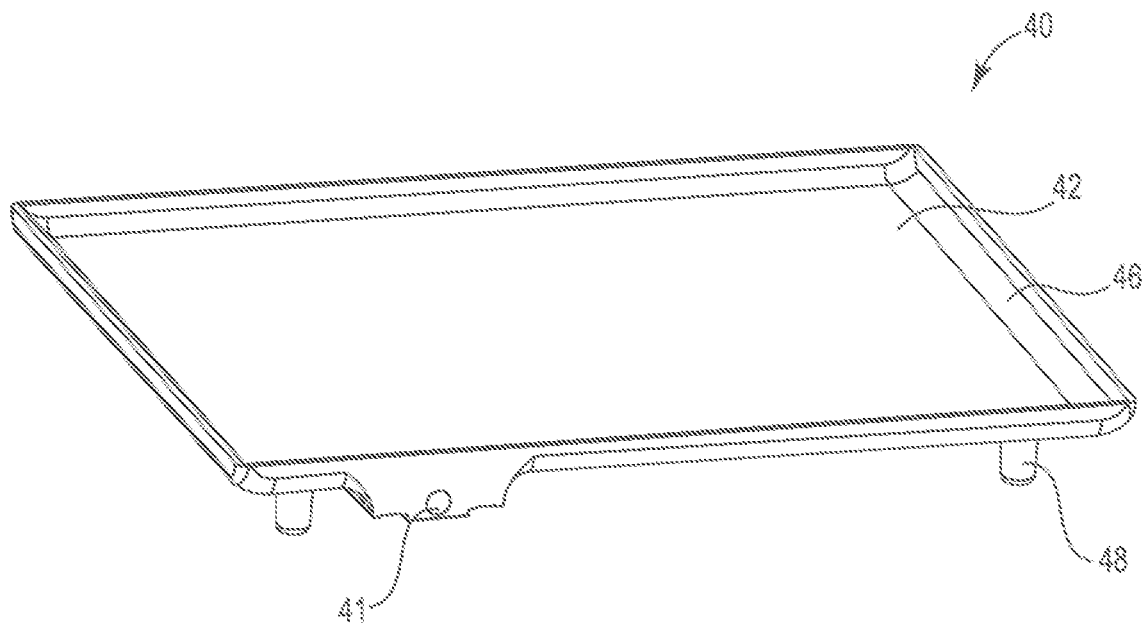
FIG. 4 is a perspective view of an embodiment of a heated tray of the type that can be used in the cooking appliance of FIG. 1.

The toaster oven 10 further includes a second or top heat source 50 that provides radiant heat to the interior compartment 14. As shown in FIGS. 2 and 3, the second or top heat source 50 includes multiple heating rods (e.g., heating rods commercially available under the trade designation "Calrod") attached on or near the top wall 16. Alternatively, the second heat source 50 may include quartz-type heating element(s), ceramic-type heating element(s), halogen-type heating element(s), or the like. This second heat source 50 can be controlled separately from the heated tray 40 for situations where only a tray or rack 30 is being used to cook or heat foods and no food is being cooked via direct cooking on the heated tray 40, for example. In addition, providing an oven with two heating sources allows for a variety of cooking modes that involve only the heated tray 40 (e.g., saute', sear, etc.) and/or cooking modes that combine direct contact cooking from the heated tray 40 with radiant cooking from the top heat source 50 and/or cooking modes in which the heated tray 40 provides heat from the lower area of the oven 10 for baking or toasting food placed on the tray or rack 30.

In additional embodiments of the toaster ovens described herein, the second or top heat source may instead be a heated tray that is the same or similar to the heated tray described above. That is, the top heat source may also include heating features that are embedded within a tray or that are attached to one side of the tray. In additional embodiments, the toaster oven may include more than two heated trays and/or more than one tray or rack similar to rack 30 described above. In an embodiment that includes more than one heated tray, each of the trays can be heated to the same or different temperatures to accommodate the cooking of various food products. In additional embodiments, one or more of the heated trays and/or other racks may not be removable from the toaster oven but may instead be permanently mounted in the interior oven space. In additional embodiments, one or more heated elements are provided that are not attached or directly adjacent to any of the various trays that may be positioned within the interior space of the toaster oven.

The heated tray 40 is removable from the interior compartment 14 of the toaster oven 10. In this way, the inner area of the interior compartment 14 can be more easily accessed for cleaning, if necessary. In addition, the heated tray 40 can be used outside the toaster oven 10 as a stand-alone griddle or skillet by connecting the electrical receptacle of the heated tray to an electrical cord that is plugged into a standard outlet. It is further possible that the heated tray 40 can be used in a configuration in which it is positioned partially within the interior compartment 14 and partially outside the oven 10 during cooking.

The electrical connection of the heated tray 40 to or within the toaster oven can be submersible such that it can be washed in a sink, for example. In another alternative, the heated tray can be provided with sealed terminals for its heater(s) so that it is dishwasher safe.

As set out above, the toaster oven 10 includes a hinged access door 26. This door 26 includes a handle 27 and is hinged to rotate downwardly in order to access the interior compartment 14. The door 26 may optionally be removable from the oven body 12 to provide even better access to the interior compartment 14, such as for cleaning.

The front side of the toaster oven 10 may further include a control panel 60, which is shown in this embodiment as being positioned below the hinged door 26. Alternatively, the control panel may be positioned to the left or right side of the oven or above the oven cavity. The control panel 60 may include any of a number of standard control devices or user interfaces for selecting the oven temperature, cooking time, and the like. Such control devices can include, for example, knobs, dials, buttons, slide switches, toggle switches, touch screens, user interfaces, and/or any other type of suitable input device. Further, it is possible that the user can select a mode and/or cooking time and temperature using a computing device as the input device, where such a device communicates with the oven remotely over a wired and/or wireless network. The control panel 60 may also include preset features for commonly used cooking times and/or temperatures. Like the hinged door 26, the control panel 60 may be removable from the oven body 12 to provide better access to the interior compartment 14. In an embodiment, the control panel can be provided with electrical connections such as a plug-style connection where male terminals are inserted into a female receptor, or a magnetic style connection where a magnet holds components together while positive or negative terminals are connected, for example.

The heated tray 40 may include a feature that allows for steam cleaning of the oven by selecting such a mode on the control panel. With this feature, the user will pour a specified amount of water onto the tray 40, close the oven door, then activate a "clean" feature or option. The heated tray 40 will then heat to a certain temperature that will convert the water to steam. The steam feature can be used for a specific length of time and/or until some or all of the water becomes steam and the clean cycle is complete.

Figure 6:
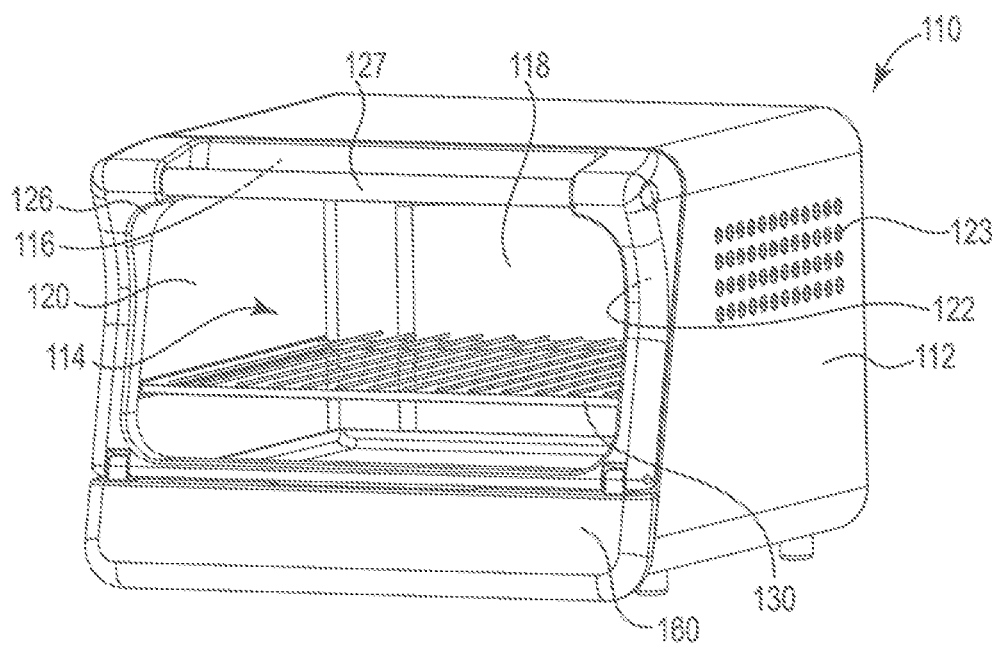
FIG. 6 is a perspective view of another embodiment of a cooking appliance of the present disclosure with its door in a closed position.
Figure 7:
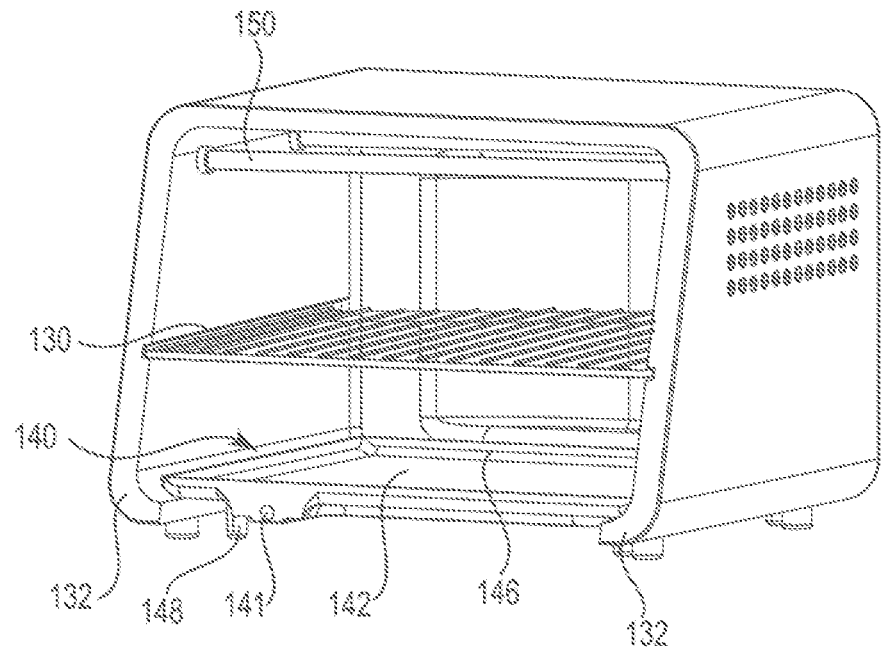
FIG. 7 is a perspective view of the cooking appliance of FIG. 6 with its door and control panel removed.
Figure 8:
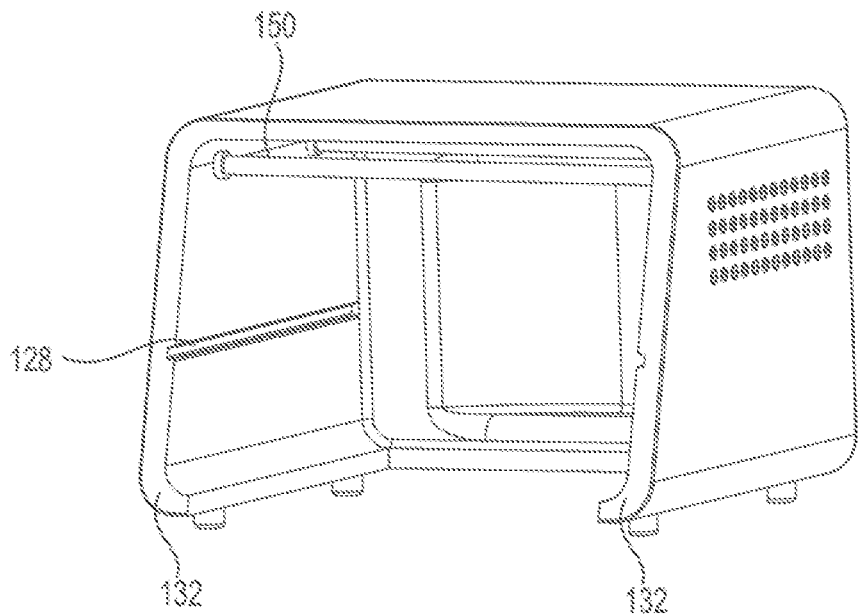
FIG. 8 is a perspective view of the cooking appliance of FIG. 6 with its door, control panel, and heated lower tray removed.

Referring now to FIGS. 6-8, another exemplary configuration of a cooking appliance or toaster oven 110 is illustrated. Toaster oven 110 includes an oven body 112 having an interior compartment 114 that is defined by a top wall 116, a back wall 118, opposite side walls 120, 122, a removable heated tray 140, and a hinged door 126. The hinged door 126 forms the front of the oven 110 and is configured so that it pivots downwardly to provide access to the interior compartment 114. The toaster oven 110 further includes a tray or rack 130 is removably positionable relative to the interior compartment 114.

The side walls 120, 122 each include at least one support feature, which is illustrated as an elongated slot 128 in each of the side walls. These slots 128 can extend along all or a part of the depth of the side walls 120, 122. The slots 128 are provided as a cooperating pair that are generally horizontally disposed and spaced at the same vertical location along their respective side walls 120, 122. In this way, a removable tray or rack 130 can be supported by the slots 128 in a horizontal orientation, which will generally be parallel to both the top wall 116 and the heated tray 140. More than one pair of slots can be provided at different locations along the height of the side walls 120, 122 for positioning the tray or rack 130 at different heights within the oven body 112.

The side walls 120, 122 can be provided with pairs of flanges in addition to or instead of pairs of slots, wherein these flanges would act as a shelf to support an inserted tray or rack 130 in a desired vertical location within the oven body 112. If additional support for the tray or rack 130 is desired, the back wall 118 may also include flanges and/or slots. In another alternative, the tray or rack 130 is not supported by any wall features but instead rests on a top surface of the heated tray 140. As shown, the side walls 120, 122 also include vents 123 for dissipating heat generated during operation of the toaster oven 110. The back wall 118 and/or other areas of the body can also include vents, if desired.

Tray or rack 130 is sized and shaped to be supported by the support features 128 of the side walls 120, 122, and may have a wide variety of configurations. For one example, the tray or rack 130 may include a peripheral frame member and a series of elongated rods or grates that extend from one side of the frame to the other. In another example, wires or rods can be arranged into a pattern, such as a grid pattern, within the peripheral frame member. In another example, the tray or rack 130 may include a generally planar top surface across all or a part of its surface area. In yet another example, the tray or rack 130 can have a textured or patterned surface. The tray or rack 30 can optionally include a non-stick material on all or a part of its surface. In an embodiment, the toaster oven 110 can be provided with multiple interchangeable trays or racks 130 that have different cooking capabilities. In another embodiment, the toaster oven is not provided with any trays or racks 130, but is instead only provided with the heated tray 140.

Removable heated tray 140 includes a top tray surface 142 and a heating source positioned below and attached to the top tray surface 142. The top tray surface 142 may include a relatively flat or planar surface across all or a part of its surface area, such as may be desirable to cook foods like pizza or other items that require a relatively uniform heated surface for conductive cooking. The top tray surface 142 may include areas with a raised pattern, such as a grate-like pattern, across all or a part of its surface area. Alternatively, the top tray surface 142 may include depressed areas or a combination of raised areas and depressed areas, where these areas may be in a pattern or randomly arranged across the top tray surface 142. The top tray surface 142 can optionally include a non-stick material on all or a part of its surface.

In another variation, an embedded heating element can appear on the top tray surface 142 instead of on the underside of the heated tray 140. In this way, a "visual indication" or visual indicia is provided to the user that the heated tray 140 comprises a heated surface. In such a variation, the heating element can be cast or brazed into place or otherwise attached so that the surface remains relatively smooth or flat.

Removable heated tray 140 can include at least one wall 146 extending upwardly from the top tray surface 142, such as along one of its peripheral edges. In an embodiment, side walls 146 extend upwardly from the top tray surface 142 around the perimeter of the heated tray 140 to provide a space that is enclosed on all sides, which may be convenient for containing foods within the perimeter of the heated tray 140.

The heat source (not shown) for the removable heated tray 140 is positioned under the top tray surface 142, and can be attached to the side of the tray that is opposite the top tray surface 142. One configuration of this heat source is the same as that shown for heat source 44 of FIG. 5. The heat source may also be embedded or enclosed within the heated tray 140, such as by providing another tray surface (not shown) below the heat source. Such a tray surface can be provided as a heat shield that protects the area under the heated tray 140, which may be a countertop due to this configuration of a toaster oven 110, from reaching an undesirably high temperature.

The heat source used for this embodiment of a heated tray 140 may include one or more tubular heaters, and/or may include quartz-type heating element(s), ceramic-type heating element(s), halogen-type heating element(s), or the like. The heat source is used to heat the top tray surface 142 within the interior compartment 114. If multiple heat sources are provided, they may be arranged to generally follow the perimeter shape of the heated tray 140, or may be parallel to each other across the length or width of the heated tray 140, or may be provided in another configuration. In an embodiment where a single heat source is provided, it may be configured as a single tubular heater in a loop, a coil, a zigzag, or otherwise arranged to consistently heat the top tray surface 142.

The side walls 120, 122 can each include a lower extending member 132 that can contact and support the lower surface of the heated tray 140 when it is inserted into the oven 110. However, these extending members 132 may instead be positioned so that they are spaced at least slightly below the lower surface of the heated tray 140; in this configuration, either the bottom of the tray 140 or the top of the extending members(s) 132 may include some type of seal or other structure that can contact the lower surface of the heated tray 140 to "close" the interior compartment 114.

The heated tray 140 can be provided with legs 148 or other support members extending from its bottom surface. The legs 148 can be arranged to keep the heated tray 140 slightly above the extending members 132, or they can be designed to rest on the surface on which the oven 110 is placed, such as a countertop surface.

The heated tray 140 can utilize a wide variety of electrical connections to receive power. In one embodiment, a probe-style electrical connector (with or without its own temperature control) has a probe that is insertable into a hole 141 of heated tray 140. Electrical connection is made between terminals on the heated tray 140 and holes provided in the probe-style connector, and heat can be controlled with a thermostat control member, such as a dial or a knob. In another embodiment, a "plug style" connection is used, where male terminals of one component are inserted into a female receptor. In yet another embodiment, a magnetic style electrical connection is used wherein a magnet holds components together while positive and negative terminals are electrically connected. Other electrical connections can additionally or alternatively be used.

The toaster oven 110 further includes a second or top heat source 150 that provides radiant heat to the interior compartment 114. As shown in FIGS. 7 and 8, the second or top heat source 150 includes multiple heating rods (e.g., heating rods commercially available under the trade designation "Calrod") attached on or near the top wall 116. Alternatively, the second heat source 150 may include quartz-type heating element(s), ceramic-type heating element(s), halogen-type heating element(s), or the like. This second heat source 150 can be controlled separately from the heated tray 140 for situations where only a tray or rack 130 is being used to cook or heat foods and no food is being cooked via direct cooking on the heated tray 140, for example. In addition, providing an oven with two heating sources allows for a variety of cooking modes that involve only the heated tray 140 (e.g., sauté', sear, etc.) and/or cooking modes that combine direct contact cooking from the heated tray 140 with radiant cooking from the top heat source 150 and/or cooking modes in which the heated tray 140 provides heat from the bottom of the oven 110 for baking or toasting food placed on the tray or rack 130.

In additional embodiments of the toaster ovens described herein, the second or top heat source may instead be a heated tray that is the same or similar to the heated tray 140 described above. That is, the top heat source may include heating features that are embedded within a tray or that are attached to one side of the tray.

The heated tray 140 is removable from the cooking appliance 110, which will thereby effectively remove the bottom surface of the interior compartment 114. In this way, the remaining walls of the interior compartment 114 can be more easily accessed for cleaning, if necessary. In addition, the heated tray 140 can be used outside the toaster oven 110 as a stand-alone griddle or skillet by connecting the electrical receptacle of the heated tray to an electrical cord that is plugged into a standard outlet. It is further possible that the heated tray 140 can be used in a configuration in which it is partially within the interior compartment 114 and partially positioned outside the oven 110 during cooking.

The electrical connection of the heated tray 140 to or within the toaster oven can be submersible such that it can be washed in a sink, for example. In another alternative, the heated tray can be provided with sealed terminals for its heater(s) so that it is dishwasher safe.

As set out above, the toaster oven 110 includes a hinged access door 126. This door 126 includes a handle 127 and is hinged to rotate downwardly in order to access the interior compartment 114. The door 126 may optionally be removable from the oven body 112 to provide even better access to the interior compartment 114, such as for cleaning.

The front side of the toaster oven 110 may further include a control panel 160, which is shown in this embodiment as being positioned below the hinged door 126. Alternatively, the control panel may be positioned to the left or right side of the oven or above the oven cavity. The control panel 160 may include any of a number of standard control devices for selecting the oven temperature, cooking time, and the like. Such control devices can include, for example, knobs, dials, buttons, slide switches, toggle switches, touch screens, user interfaces, and/or any other type of suitable input device. Further, it is possible that the user can select a mode and/or cooking time and temperature using a computing device as the input device, where such a device communicates with the oven remotely over a wired and/or wireless network. The control panel 160 may also include preset features for commonly used cooking times and/or temperatures. Like the hinged door 126, the control panel 160 may be removable from the oven body 112 to provide better access to the interior compartment 114. In an embodiment, the control panel can be provided with electrical connections such as a plug-style connection where male terminals are inserted into a female receptor, or a magnetic style connection where a magnet holds components together while positive or negative terminals are connected, for example.

In an alternative to embodiments described herein that include specific walls as are described above relative to some embodiments, the oven body can include an interior compartment and a door for accessing this interior compartment, but does not specifically include top, bottom, back, and/or side walls. Various embodiments that exemplify these and other oven body configurations are described below and illustrated in the figures.

Figure 9A:
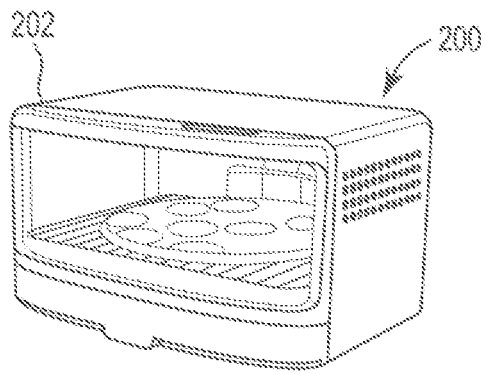
FIGS. 9A and 9B are perspective views of another embodiment of a cooking appliance of the present disclosure with its door in a closed position and an open position, respectively.
Figure 9B:
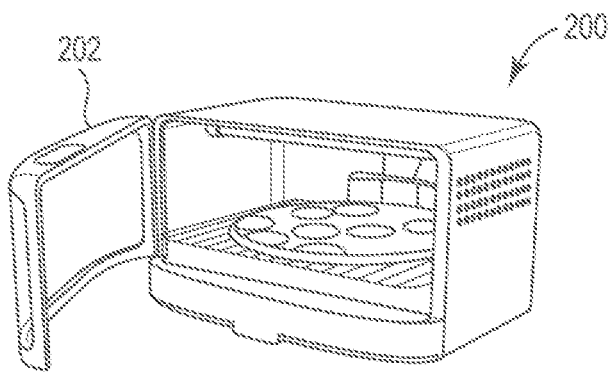

FIGS. 9A and 9B are perspective views of another embodiment of a cooking appliance 200 of the present disclosure with its door 202 in a closed position and an open position, respectively. In this embodiment, the door hinges from one side for access to the interior area of the appliance 200, and may be hinged on either the left side or the right side, as desired.

Figure 10A:
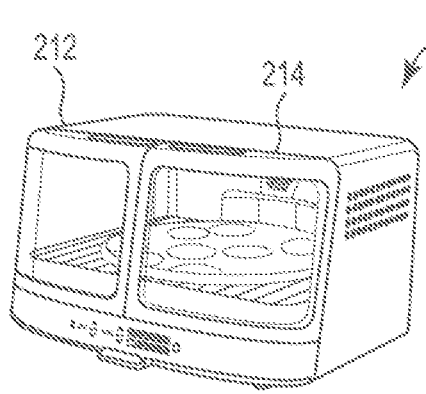
FIGS. 10A and 10B are perspective views of another embodiment of a cooking appliance of the present disclosure with its door in a closed position and an open position, respectively.
Figure 10B:
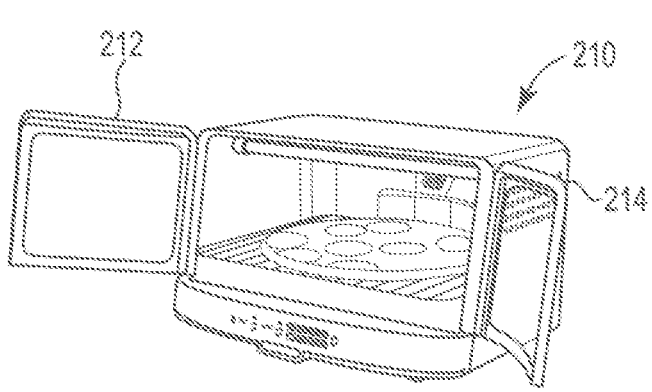

FIGS. 10A and 10B are perspective views of another embodiment of a cooking appliance 210 of the present disclosure with its doors 212, 214 in a closed position and an open position, respectively. In this embodiment, the doors 212, 214 are configured in a "French door" configuration, wherein the door 212 is hinged at the left side of the appliance 210 and the door 214 is hinged at the right side of the appliance 210. The doors 212, 214 may be the same or different sizes.

Figure 11A:
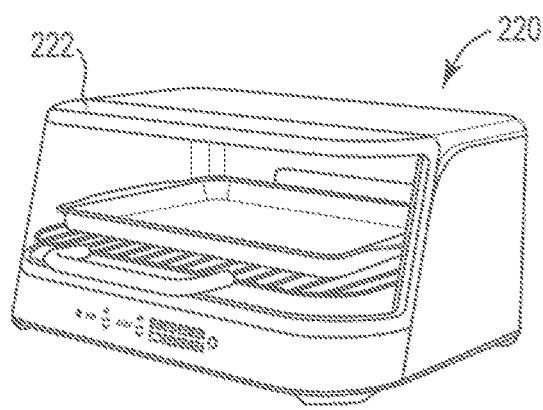
FIGS. 11A and 11B are perspective views of another embodiment of a cooking appliance of the present disclosure with its doors in a closed position and an open position, respectively.
Figure 11B:
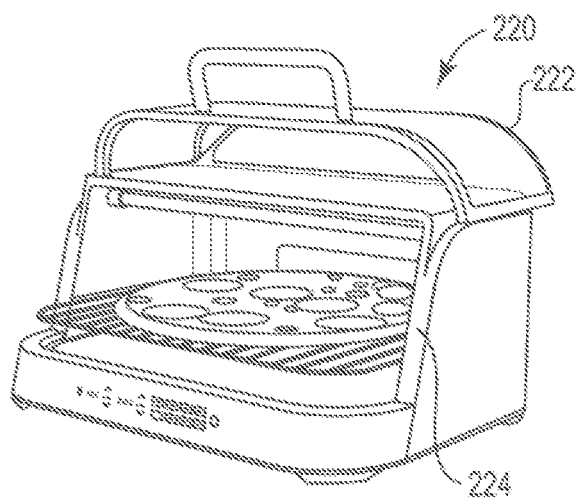

FIGS. 11A and 11B are perspective views of another embodiment of a cooking appliance 220 of the present disclosure with its door 222 in a closed position and an open position, respectively. In this embodiment, the door 222 is configured to slide up and over the top of the appliance 220, such as along rails or sloped surfaces 224 on the left and right sides of the appliance. The door 22 can be moved to a position in which the interior area of the appliance 220 is easily accessible without the door 222 falling to its closed position.

Figure 12:
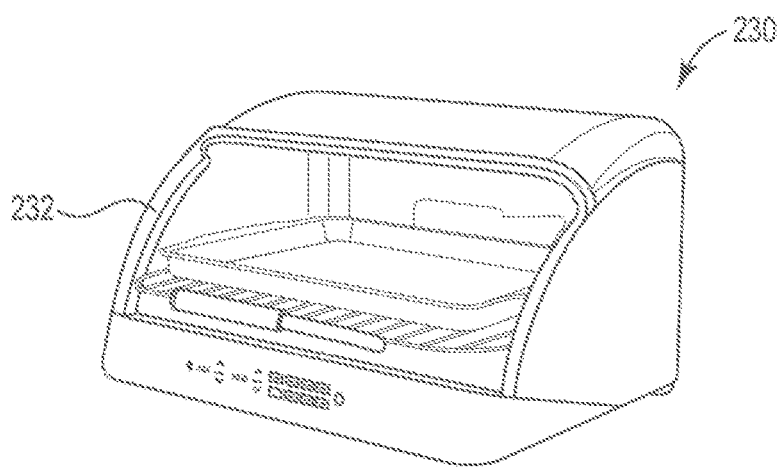
FIG. 12 is a perspective view of another embodiment of a cooking appliance of the present disclosure with its door in a closed position.

FIG. 12 is a perspective view of another embodiment of a cooking appliance 230 of the present disclosure with its door 232 in a closed position. In this embodiment, the door 232 slides back on a curve relative to the body of the appliance 230.

Figure 13A:
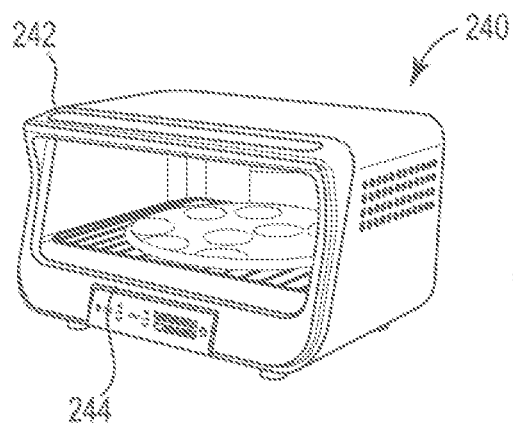
FIGS. 13A and 13B are perspective views of another embodiment of a cooking appliance of the present disclosure with its door in a closed position and an open position, respectively.
Figure 13B:
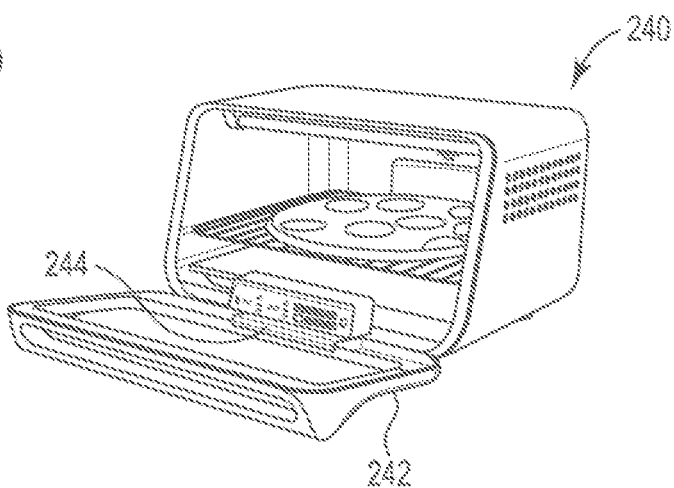

FIGS. 13A and 13B are perspective views of another embodiment of a cooking appliance 240 of the present disclosure with its door 242 in a closed position and an open position, respectively. In this embodiment, the door 242 is hinged at the bottom of the appliance 240 and includes a slot or gap 244 through which the controls can be accessed by a user.

Figure 14A:
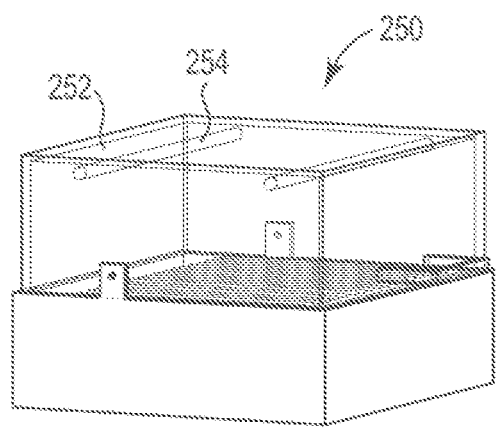
FIGS. 14A and 14B are perspective views of another embodiment of a cooking appliance of the present disclosure with its door in a closed position and an open position, respectively.
Figure 14B:
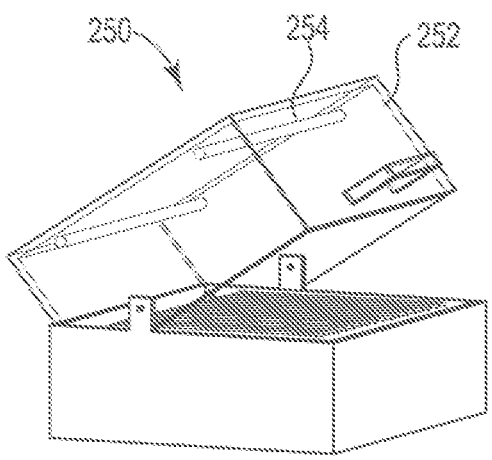

FIGS. 14A and 14B are perspective views of another embodiment of a cooking appliance 250 of the present disclosure with its door 252 in a closed position and an open position, respectively. In this embodiment, the door 252 comprises the top portion of the appliance 250 and is hinged from the sides. Further, upper heating elements 254 are attached to the upper area of the door 252 and will therefore pivot with the door 252 when it is opened. In such an embodiment, a lower heating tray may be inserted from the top of the appliance 250 rather than from the front.

Figure 15A:
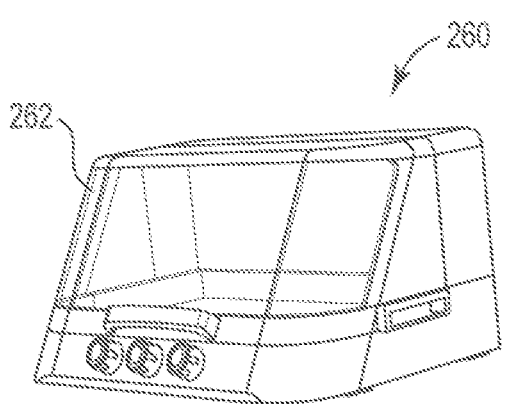
FIGS. 15A and 15B are perspective views of another embodiment of a cooking appliance of the present disclosure with its door in a closed position and an open position, respectively.
Figure 15B:
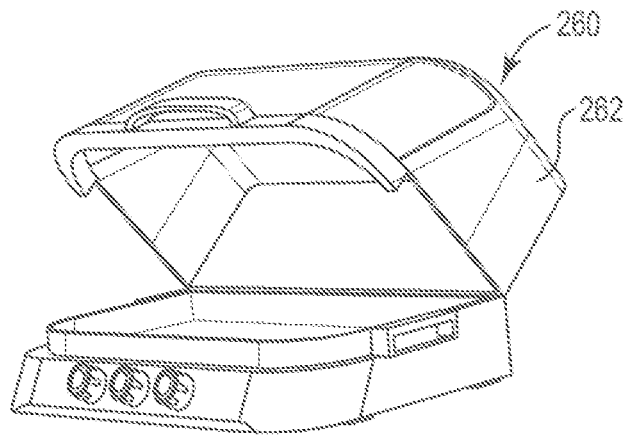

FIGS. 15A and 15B are perspective views of another embodiment of a cooking appliance 260 of the present disclosure with its door 262 in a closed position and an open position, respectively. This embodiment is similar to that illustrated in FIGS. 14A and 14B in that its door 262 comprises the top portion of the appliance 260, but the door 262 is hinged at the back of the appliance 260 rather than along the sides.

Figure 16A:
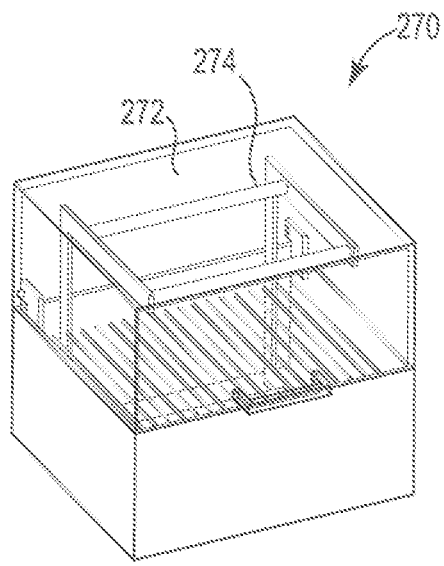
FIGS. 16A and 16B are perspective views of another embodiment of a cooking appliance of the present disclosure with its door in a closed position and an open position, respectively.
Figure 16B:
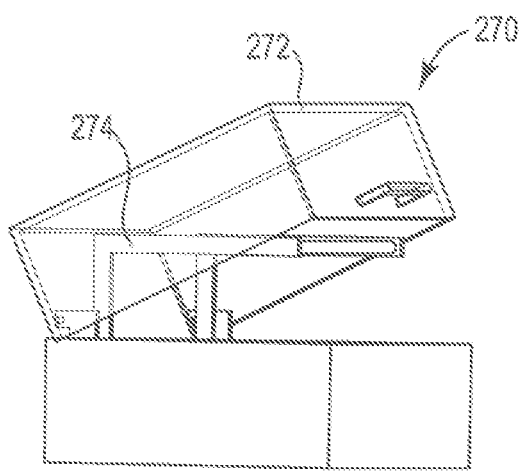

FIGS. 16A and 16B are perspective views of another embodiment of a cooking appliance 270 of the present disclosure with its door 272 in a closed position and an open position, respectively. As with the embodiment illustrated in FIGS. 15A and 15B, the door 272 comprises the top portion of the appliance 270 and is hinged at the back of the appliance, but in this embodiment, the upper heating elements 274 remain fixed or stationary when the door 272 is moved.

Figure 17:
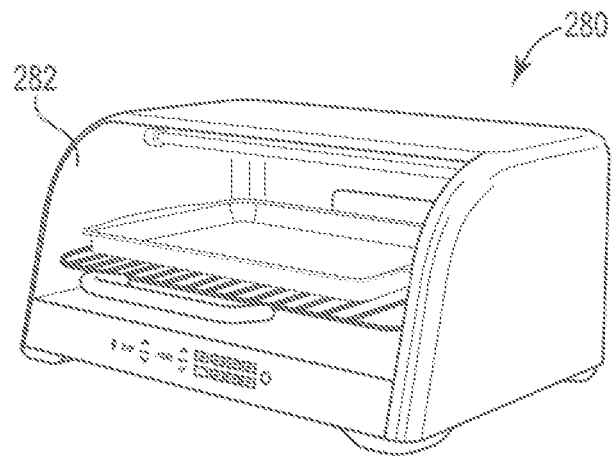
FIG. 17 is a perspective view of another embodiment of a cooking appliance of the present disclosure with its door in a closed position.

FIG. 17 is a perspective view of another embodiment of a cooking appliance 280 of the present disclosure with its door 282 in a closed position. In this embodiment, the door 282 is hinged at the top of the appliance 280.

Figure 18:
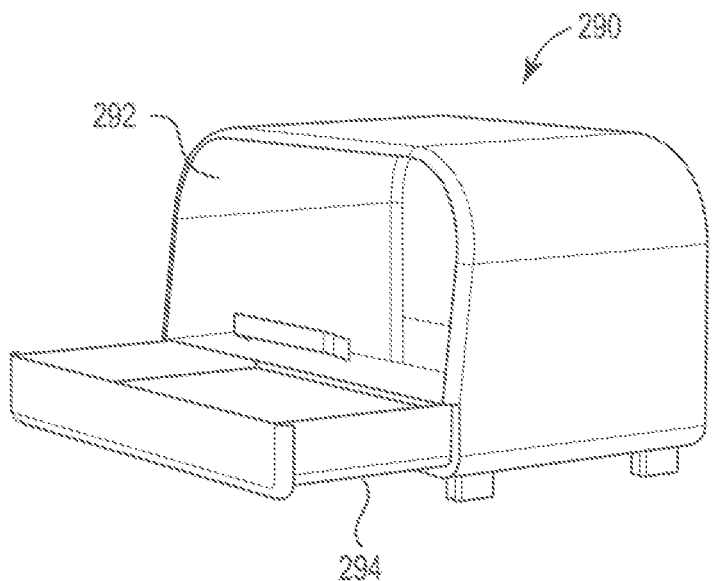
FIG. 18 is a perspective view of another embodiment of a cooking appliance of the present disclosure.

FIG. 18 is a perspective view of another embodiment of a cooking appliance 290 of the present disclosure. Appliance 290 includes a door 292 that is hinged to the appliance body, along with a slide-out tray 294 that includes the bottom heating plate.

Figure 19:
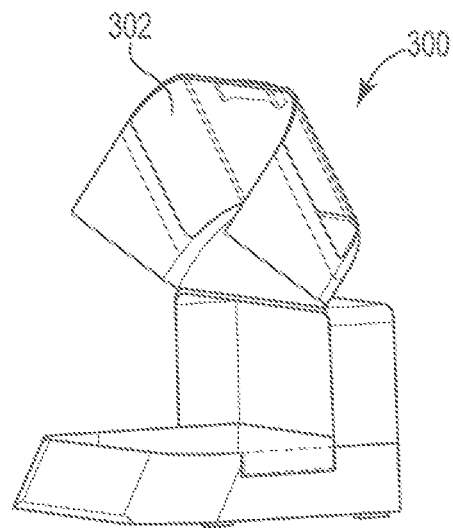
FIG. 19 is a perspective view of another embodiment of a cooking appliance of the present disclosure.

FIG. 19 is a perspective view of another embodiment of a cooking appliance 300 of the present disclosure, which includes a door 302 that is hinged to pivot along the top of the appliance near the back. In this way, more of the inner cavity of the appliance 300 is exposed when the door 302 is in its open position.

Figure 20A:
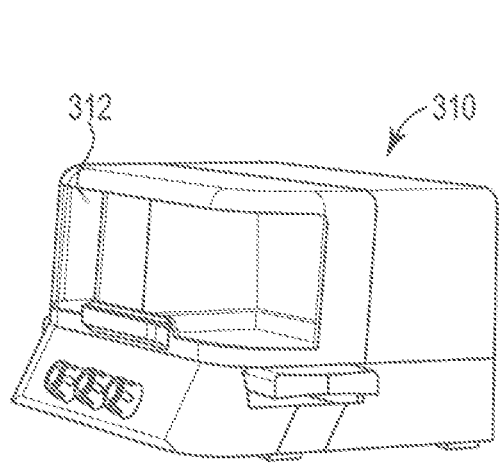
FIGS. 20A and 20B are perspective views of another embodiment of a cooking appliance of the present disclosure with its door in a closed position and an open position, respectively.
Figure 20B:
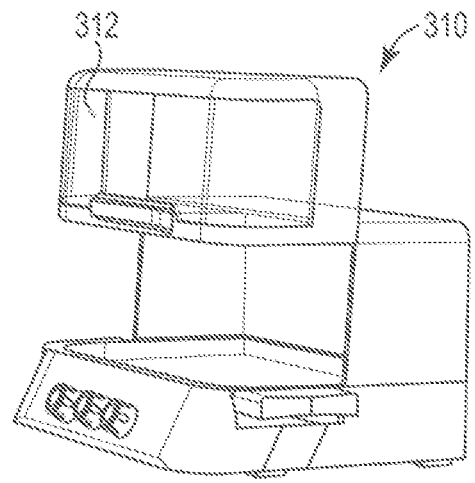

FIGS. 20A and 20B are perspective views of another embodiment of a cooking appliance 310 of the present disclosure with its door 312 in a closed position and an open position, respectively. In this embodiment, the door 312 slides upwardly to expose the inner cavity of the appliance 310.

Embodiments of the toaster ovens of the present disclosure can optionally further include one or more fans (not shown) that are positioned to circulate air within the interior compartment. Such fans can help to provide a more even temperature throughout the oven. In addition, the fan(s) can be used in an "air fry" cooking mode in which the fan circulates hot air to crisp and/or brown the surface of the food.

Figure 21:
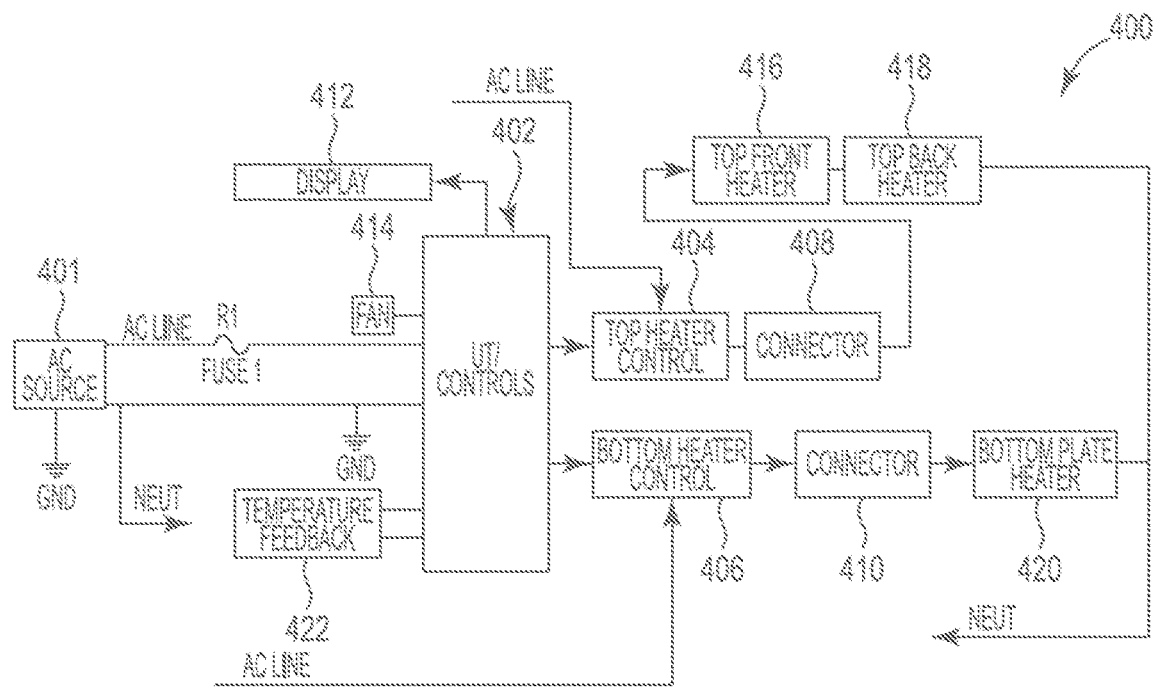
FIG. 21 is an electrical block diagram for a cooking appliance of the present disclosure.
Figure 22:
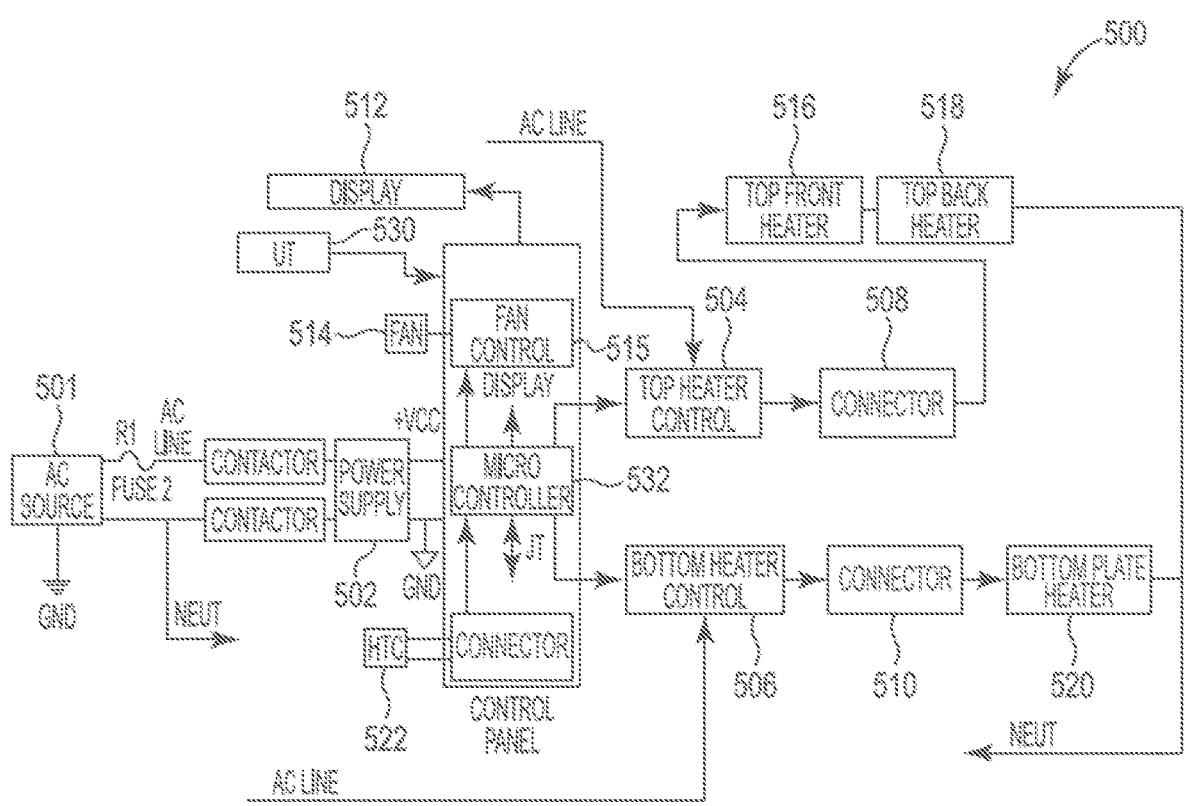
FIG. 22 is another electrical block diagram for a cooking appliance of the present disclosure.
Figure 23:
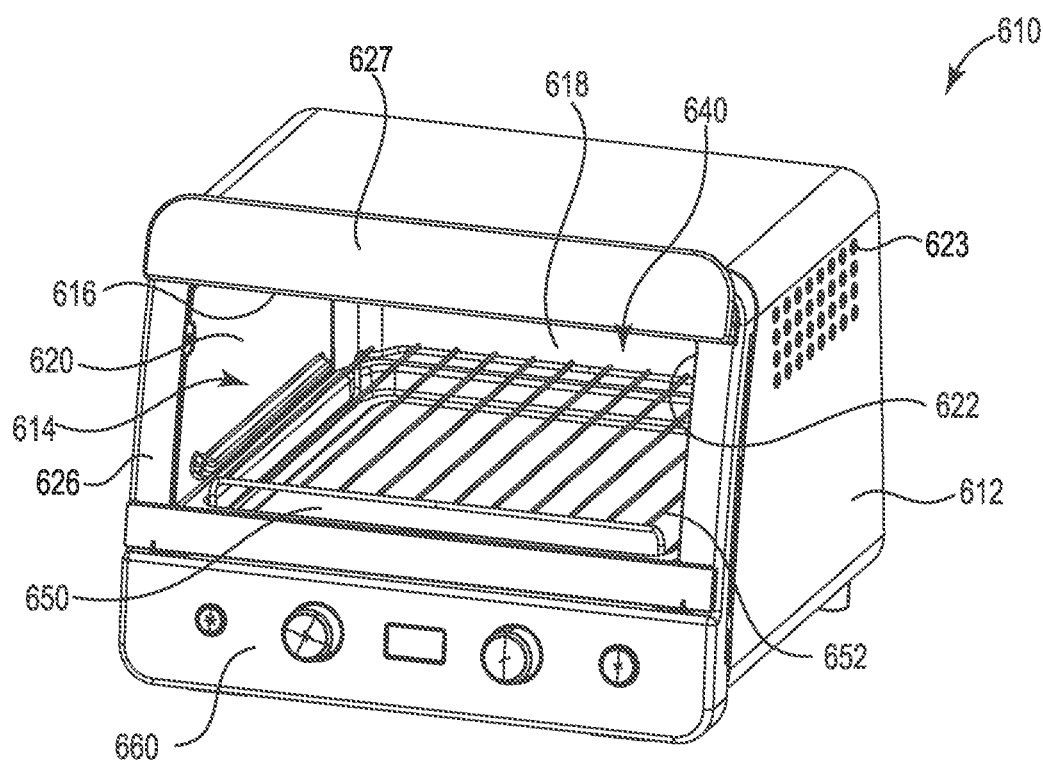
FIG. 23 is a perspective view of another embodiment of a cooking appliance of the present disclosure, with a rack raised above a tray.
Figure 24:
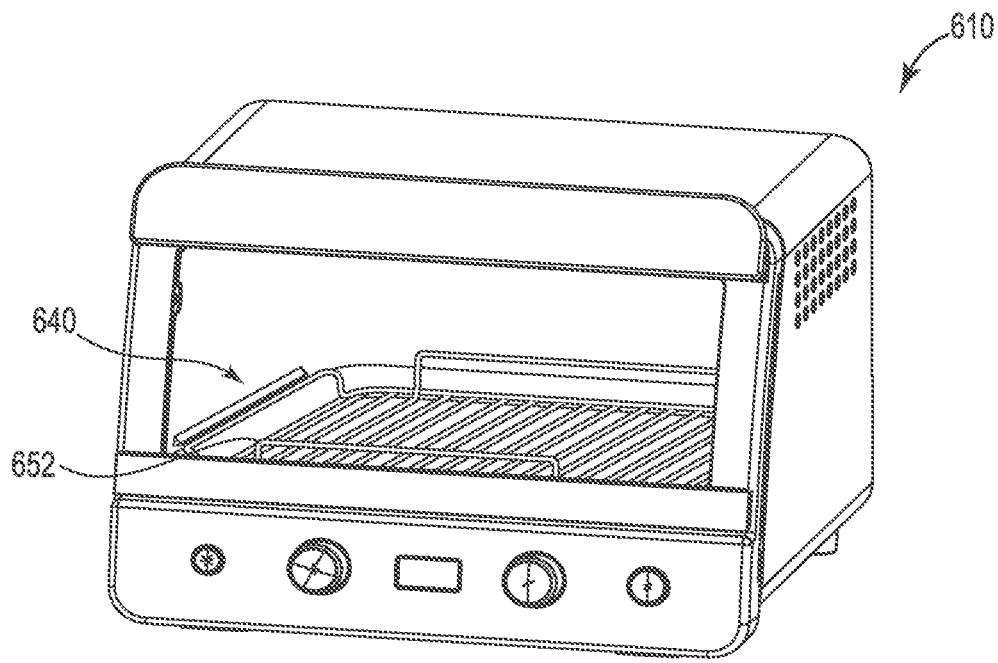
FIG. 24 is a perspective view of the cooking appliance of FIG. 23, with the rack sitting inside the tray.

FIGS. 21 and 22 are two exemplary electrical block diagrams for electrical systems 400, 500 (respectively) of a cooking appliance of the present disclosure. In general, the electrical systems include a control unit for operating the multiple heating elements to cook the food products. The control unit may include a microprocessor operatively connected to memory with programming for a plurality of cooking processes, wherein the control unit is designed to operate the heating element in the plurality of cooking processes. Examples of control units for heating appliances that utilize microprocessors are described, for example, in Applicant's co-pending patent application Ser. No. 15/013,770 entitled "HEATING APPLIANCE," filed on Feb. 2, 2016, and Ser. No. 14/638,447 entitled "COOKING APPLIANCE WITH DIFFERENT MODES FOR COOKING DIFFERENT TYPES OF FOOD PRODUCTS," filed on Mar. 4, 2015, the entire disclosures of which are incorporated by reference herein for all purposes.

Electrical system 400 includes a user interface/control system 402 fed by an AC power source 401 for controlling a top heater control 404 and a bottom heater control 406, and may include control of a display 412 and a fan 414. The top heater control 404 is connected via a connector 408 to a top front heater 416 and a top rear heater 418. Similarly, the bottom heater control 406 is connected via a connector 410 to a bottom plate heater 420. The system 400 further includes a temperature feedback 422.

Electrical system 500 includes a power supply 502 fed by an AC power source 501, a top heater control 504, and a bottom heater control 506, and may include control of a display 512 and a fan 514. The top heater control 504 is connected via a connector 508 to a top front heater 516 and a top rear heater 518. Similarly, the bottom heater control 506 is connected via a connector 510 to a bottom plate heater 520. The system 500 may further include a fan control 515 for an optional fan 514, a user interface 530, and a microcontroller 532.

Referring now to FIGS. 23-29, another exemplary configuration of a cooking appliance or toaster oven 610 is illustrated. Toaster oven 610 includes an oven body 612 having an interior compartment 614 that is defined by a top wall 616, a bottom wall 617, a back wall 618, opposite side walls 620, 622, a removable rack and tray system 640, and a door 626. The door 626 forms at least a portion of the front of the oven 610 and is moveable (e.g, hingedly moveable) to provide access to the interior compartment 614.

The side walls 620, 622 each include at least one support feature, which is illustrated as an elongated flange 628 extending from each of the side walls. These flanges 628 can extend along all or a part of the depth of the side walls 620, 622 and are provided as a cooperating pair that are generally horizontally disposed and spaced at the same vertical location along their respective side walls 620, 622. In this way, a portion of the rack and tray system 640 can be supported by the flanges 628 in a horizontal orientation, which will generally be parallel to the top wall 616 and/or bottom wall 617. More than one pair of flanges can be provided at different locations along the height of the side walls 620, 622 for positioning the rack and tray system 640 at different heights within the interior compartment 614.

The side walls 620, 622 can be provided with pairs of slots in addition to or instead of pairs of flanges, wherein these slots would cooperate with the side edges of an inserted rack and tray system 640 in a desired vertical location within the oven body 612. As shown, the side walls 620, 622 also include vents 623 for dissipating heat generated during operation of the toaster oven 610. The back wall 618 and/or other areas of the body can also include vents, if desired.

Removable rack and tray system 640 includes a lower tray 650 to which a rack 652 is attached or mounted. The rack 652 may include multiple spaced wire bars, as shown, or can have a different configuration. The lower tray 650 is generally configured so that it fits relatively tightly within the interior compartment 614, thereby minimizing or preventing crumbs and other food debris (e.g., grease) from falling to the bottom wall 617 of the toaster oven 610. That is, items falling from the rack 652 will be caught on a top surface 654 of the tray 650 and cannot fall to the bottom wall 617 of the compartment 614.

The tray 650 may be made of an aluminum substrate, for example, and may have an optional non-stick coating (e.g., a non-stick ceramic coating) on at least one of its top surface 654 and its bottom surface 656 that facilitates easy clean-up after cooking. Other non-stick coatings can be used instead of non-stick ceramic to provide for easy cleaning, as desired. The rack and tray system 640 can be removable from the interior compartment 614 for cleaning, but must be in place whenever the oven is in use.

The tray 650 is engineered to transfer the heat from the bottom heating elements efficiently so as to not negatively impact the cooking performance. The optional ceramic coating provided on the top surface 654 and/or bottom surface 656 of the tray 650 enables the easy cleaning feature mentioned above, and also provides desired emissivity and absorptivity properties. The provided coating may be black in color to enable heat absorption and emission, but it can instead be other colors that meet certain heat transfer requirements. Any coating provided on the tray 650 can instead include other coating types to enable the non-stick properties and meet the heat transfer requirements for cooking food products.

Figure 29:
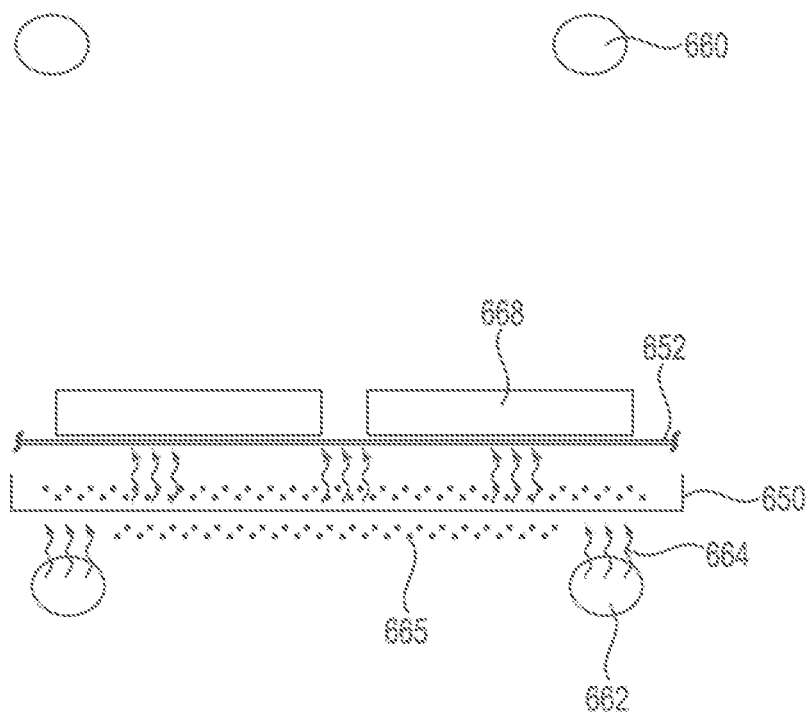
FIG. 29 is a schematic representation of a cooking process using a cooking appliance similar to that illustrated in FIG. 23.

As is best illustrated in FIG. 29, an exemplary heating system for cooking appliance 610 is represented schematically and includes upper heating elements 660 and lower heating elements 662. As shown, lower heating elements 662 are positioned below the lower tray 650 to provide both radiation (represented by arrows 664) and conduction (represented by the dots 665) to heat up the removable tray 650. The removable tray 650 transfers the heat via conduction and radiation to the food 668 positioned on the rack 652. The upper heating elements 660 provide radiant and conductive heat to the interior compartment 614.

Both the upper and lower heating elements 660, 662 can be heating rods (e.g., heating rods commercially available under the trade designation "Calrod"). Alternatively, the heating elements 660, 662 may include quartz-type heating element(s), ceramic-type heating element(s), halogen-type heating element(s), or the like. The upper heating elements 660 may be controlled independently from the lower heating elements 662, or the heating elements 660, 662 may be controlled via a single control source that coordinates the heat from both sources. Providing an oven with two areas of heating sources allows for a variety of cooking modes that involve only heat from the lower heating elements 662 and/or cooking modes that combine direct contact cooking with radiant cooking, and/or cooking modes in which the heat from the tray 650 provides for baking or toasting food placed on the rack 652 that is positioned low in the tray 650.

The rack and tray system 640 may have an upper rack position (illustrated in FIG. 23, for example) where the rack 652 is spaced from the lower tray 650. In this upper position, food can be cooked using baking and broiling modes, for example. The rack and tray system 640 may further include a lower rack position (illustrated in FIG. 24, for example) where the rack 652 is closer to or resting on the lower tray 650. In this lower position, food can be cooked using a toasting mode, for example. In the lower position, the rack 652 can be spaced slightly from the top surface 654 of tray 650 or can be slightly spaced from the top surface 654. In an embodiment, the rack 652 can be changed between its upper and lower positions by simply removing the rack 652, flipping it over 180 degrees, and repositioning it relative to the lower tray 650. In other embodiments, the rack and tray system 640 may include interchangeable racks 652 that provide different options for the distance at which food can be spaced from the lower tray 650. For example, the rack and tray systems of the ovens provided herein may be provided with an air fry mesh tray.

In one embodiment, in order to ensure that any rack(s) 652 of a rack and tray system 640 are used with a tray 650 for capturing food debris, the rack(s) are made to have a width that is at least slightly smaller than the distance between side flanges 628 on opposite side walls 620, 622. In this way, if a user attempts to slide a rack 652 directly onto the side flanges 628 without a corresponding tray 650, the rack 652 will not be able to contact both flanges 628 and therefore will not be suspended above the bottom wall 617 of the oven 610. In other embodiments, one or more rack(s) can be provided that are wide enough to be supported on the side flanges such that the use of a bottom tray is optional. Such a configuration can be useful in situations in which the user is not concerned about food debris falling to the bottom of the toaster oven and/or when different heating capabilities are desired.

Tray 650 may comprise a relatively flat or planar member across all or a part of its surface area, and may include a slight lip or other raised surface along at least one of its edges. Such a configuration can help to contain any food debris on the top surface 654 of the tray 650. In embodiments illustrated herein, the tray 650 includes at least one wall 644 (best illustrated in FIG. 27) extending upwardly from the top tray surface 654, such as along at least one of its peripheral edges. In an embodiment, side walls 644 extend upwardly from the top tray surface 654 around its entire perimeter to provide an inner space that is enclosed on all sides.

While a tray 650 with upwardly extending walls 644 can be useful for containing crumbs and other food debris, the tray 650 can further be used for steam cleaning of the interior compartment 614, when desired. In particular, water can be poured onto the top surface 654 of the tray 650 that is positioned within the interior compartment 614 above the lower heating elements 662. The user can then select a steam cleaning mode in which the lower heating elements 662 turn on, which will heat the tray to a temperature at which the water boils in the tray and converts it to steam. The steam then condensates on the oven walls and helps loosen any debris. In this way, the walls of the inner compartment 614 will be easier to wipe down and clean.

Figure 25:
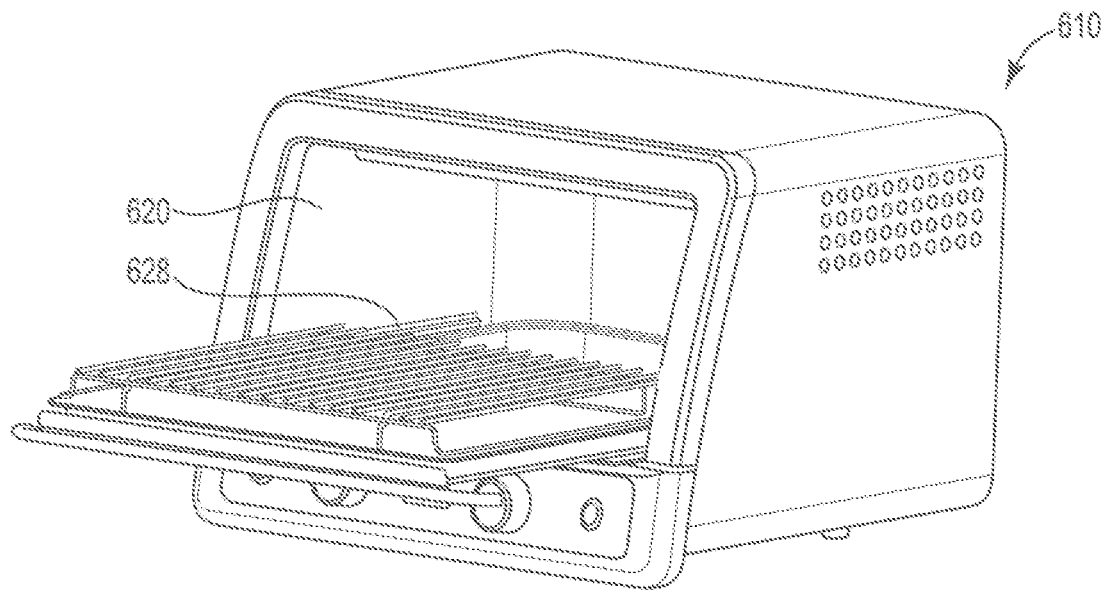
FIG. 25 is a perspective view of the cooking appliance of FIG. 23, with its rack and tray system partially removed from the oven body.
Figure 26:
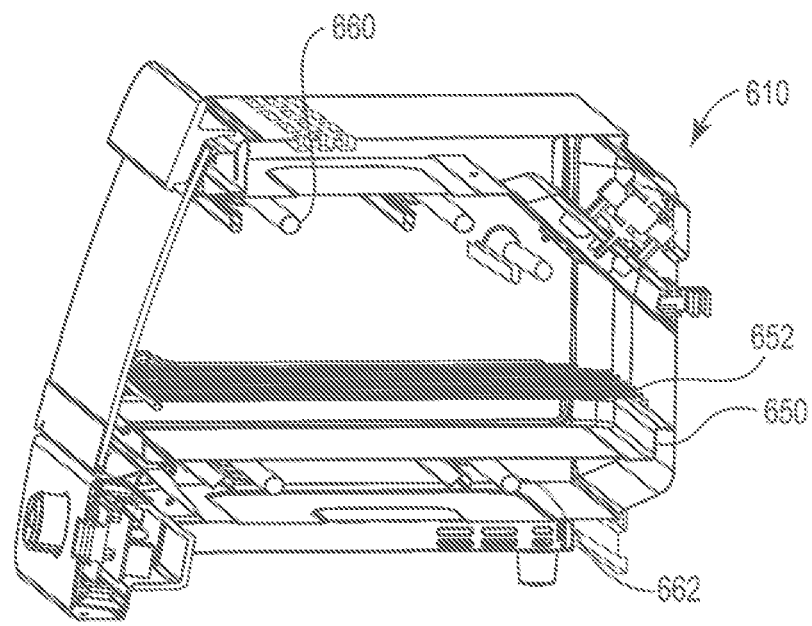
FIG. 26 is a cross-sectional side view of the cooking applicant of FIG. 23.
Figure 27:
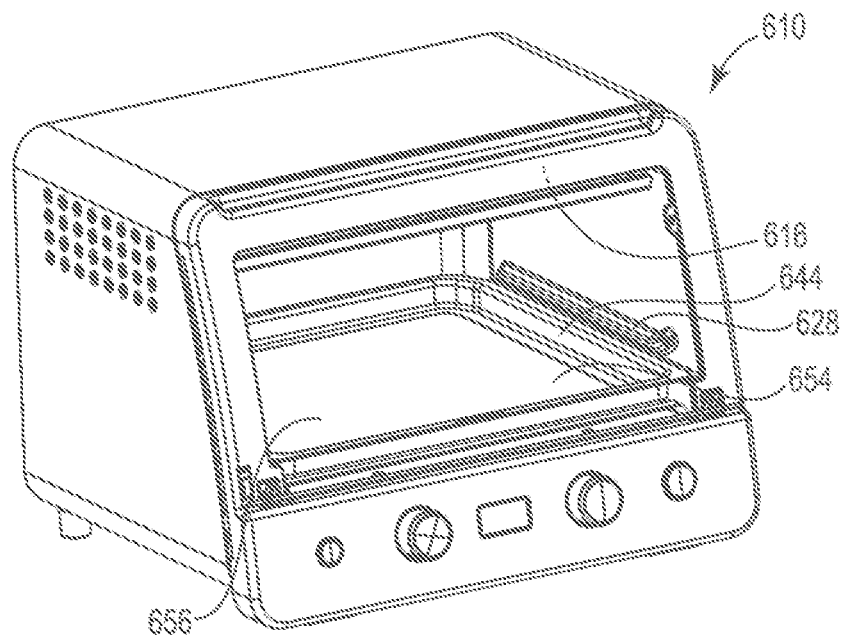
FIG. 27 is a perspective view of the cooking appliance of FIG. 23, with only the tray portion of the rack and tray system being located in the oven body.
Figure 28:
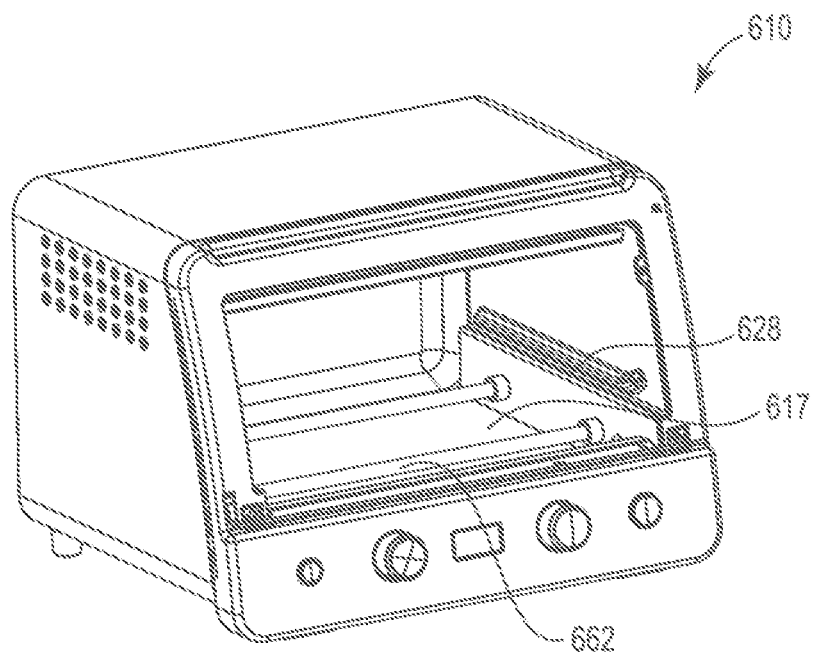
FIG. 28 is a perspective view of the cooking appliance of FIG. 23, with the rack and tray system removed from the oven body.

As set out above, the toaster oven 610 includes an access door 626. This door 626 includes a handle 627 and may be hinged to rotate downwardly in order to access the interior compartment 614. The door 626 may optionally be removable from the oven body 612 to provide even better access to the interior compartment 614, such as for cleaning. The door 626 of the oven and the rack and tray system 640 are designed such that when the tray 650 is pulled all the way out, the tray 650 can sit on a portion of the door and be supported, as is illustrated in FIG. 25. This allows the user to pull out the rack and tray system 640 from the interior compartment 614 and safely allow the food to cool after it has finished cooking. The rack and tray system 640 also fit together such that when the user pulls out the rack 652, the tray 650 also moves with it. In this way, whenever there is food on the rack 652, it will always have the tray 650 under it to catch any food debris.

The front side of the toaster oven 610 may further include a control panel 660, which is shown in this embodiment as being positioned below the door 626. Alternatively, the control panel may be positioned to the left or right side of the oven or above the oven cavity. The control panel 660 may include any of a number of standard control devices for selecting the oven temperature, cooking time, and the like. Such control devices can include, for example, knobs, dials, buttons, slide switches, toggle switches, touch screens, user interfaces, and/or any other type of suitable input device. Further, it is possible that the user can select a mode and/or cooking time and temperature using a computing device as the input device, where such a device communicates with the oven remotely over a wired and/or wireless network. The control panel 660 may also include preset features for commonly used cooking times and/or temperatures. Like the door 626, the control panel 660 may be removable from the oven body 612 to provide better access to the interior compartment 614.

The foregoing detailed description and examples have been given for clarity of understanding only. No unnecessary limitations are to be understood therefrom. It will be apparent to those skilled in the art that many changes can be made in the embodiments described without departing from the scope of the disclosure. Thus, the scope of the present disclosure should not be limited to the structures described herein, but only by the structures described by the language of the claims and the equivalents of those structures.

What is claimed is:

1. An oven comprising:
    an oven body comprising an interior compartment defined by a top wall, a bottom wall, first and second side walls extending between the top wall and the bottom wall, a back wall, and a door panel;
    a food cooking support member within the interior compartment;
    an upper heating source operatively supported within the interior compartment by the oven body above the food cooking support member;
    a radiant lower heating source operatively supported within the interior compartment by the oven body and positioned below the food cooking support;
    a heat transfer device operatively supported within the interior compartment that is spaced below the food cooking support member and that is spaced above the lower heating source, wherein the heat transfer device comprises;
        a heatable tray that transfers radiant heat from the lower heating source to food supported by the food cooking support member; and
        a control system configured for operating the upper and lower heating sources in accordance with a selected cooking mode from a plurality of selectable modes, the control system comprising a processor and memory with operating parameters for each of the plurality of selectable modes, wherein at least one selectable mode includes a set of operating parameters within memory that are executable by the processor, the operating parameters determined at least in part by the absorptivity of radiant energy from the lower heating source by the heatable tray and the emissivity of the heatable tray of radiant energy from the heatable tray toward the food cooking support member, wherein the operating parameters control the lower heating source for heating the heatable tray by radiant energy so that the heatable tray can further transfer radiant energy to food supported by the food cooking support member.

2. The oven of claim 1, wherein the heatable tray comprises a relatively flat top surface.

3. The oven of claim 1, wherein the heatable tray comprises raised rib features.

4. The oven of claim 1, wherein the heatable tray comprises a plurality of grates.

5. The oven of claim 1, wherein the heatable tray comprises a pattern of at least one of raised and depressed areas.

6. The oven of claim 1, wherein the heatable tray further comprises at least one side wall extending from a top tray surface.

7. The oven of claim 1, wherein the heatable tray is spaced from the bottom wall of the interior compartment.

8. The oven of claim 1, wherein the radiant lower heating source comprises at least one heating element spaced from a bottom surface of the heatable tray.

9. The oven of claim 1, wherein the heatable tray is removable.

10. The oven of claim 1, wherein the heatable tray is adapted for use as an independent cooking device outside the oven.

11. The oven of claim 1, wherein the heatable tray comprises an electrical connection for engagement with a receptor within the interior compartment.

12. The oven of claim 1, wherein the upper heating source is positioned adjacent to the top wall.

13. The oven of claim 1, further comprising a steam cleaning mode in which the heatable tray is further adapted to contain a quantity of liquid and convert at least a portion of the quantity of liquid into steam.

14. An oven comprising:
an oven body comprising an interior compartment defined by a top wall, a bottom wall, first and second side walls extending between the top wall and the bottom wall, a back wall, and a door panel;
a food cooking support member within the interior compartment;
an upper heating source operatively supported within the interior compartment by the oven body above the food cooking support member;
a radiant lower heating source operatively supported within the interior compartment by the oven body and positioned below the food cooking support;
a heat transfer device operatively supported within the interior compartment that is spaced below the food cooking support member and that is spaced above the lower heating source, wherein the heat transfer device comprises;
a heatable tray that transfers radiant heat from the lower heating source to food supported by the food cooking support member; and
a control system configured for operating the upper and lower heating sources in accordance with a selected cooking mode from a plurality of selectable modes, the control system comprising a processor and memory with operating parameters within memory that are executable by the processor for each of the plurality of selectable modes, the operating parameters determined at least in part by the absorptivity of radiant energy from the lower heating source by the heatable tray and the emissivity of the heatable tray of radiant energy from the heatable tray, wherein at least one selectable mode includes a steam clean mode that includes a set of operating parameters for controlling the lower heating source for heating the heatable tray having a quantity of water within the tray by radiant energy so that the heatable tray can generate steam within the interior compartment.

* * * * *